(12) United States Patent
Churan

(10) Patent No.: US 7,907,944 B2
(45) Date of Patent: Mar. 15, 2011

(54) METHODS, APPARATUS AND COMPUTER PROGRAM PRODUCTS FOR JOINT DECODING OF ACCESS PROBES IN A CDMA COMMUNICATIONS SYSTEM

(75) Inventor: Gary G. Churan, Annandale, VA (US)

(73) Assignee: ATC Technologies, LLC, Reston, VA (US)

( * ) Notice: Subject to any disclaimer, the term of this patent is extended or adjusted under 35 U.S.C. 154(b) by 1122 days.

(21) Appl. No.: 11/427,576

(22) Filed: Jun. 29, 2006

(65) Prior Publication Data

US 2007/0010246 A1  Jan. 11, 2007

Related U.S. Application Data

(60) Provisional application No. 60/696,574, filed on Jul. 5, 2005.

(51) Int. Cl.
*H04W 4/00* (2009.01)

(52) U.S. Cl. ......... 455/427; 455/428; 455/429; 455/430; 455/436

(58) Field of Classification Search .................. 455/427, 455/428, 429, 430, 436
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |

(Continued)

FOREIGN PATENT DOCUMENTS

EP    0 506 255 A2    9/1992

(Continued)

OTHER PUBLICATIONS

Gamal et al. "Iterative Multiuser Detection for Coded CDMA Signals in AWGN and Fading Channels" *IEEE Journal on Selected Areas in Communications* 18(1): 6 pages (2000).

(Continued)

*Primary Examiner* — Daniell L Negrón
*Assistant Examiner* — Huy D Nguyen
(74) *Attorney, Agent, or Firm* — Myers Bigel Sibley & Sajovec, P.A.

(57) ABSTRACT

A signal is received at a component of the wireless CDMA communications system, such as a base station or satellite gateway. A plurality of data sets is generated from the received signal, respective ones of the plurality of data sets corresponding to respective access probes received, for example, over the reverse access channel (R-ACH) or reverse enhanced access channel (R-EACH). At least some of the plurality of data sets are jointly decoded to recover an access probe payload.

36 Claims, 14 Drawing Sheets

U.S. PATENT DOCUMENTS

| | | |
|---|---|---|
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,167,056 A | 12/2000 | Miller et al. |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,757,293 B1 * | 6/2004 | Chuah et al. .................. 370/432 |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,180,881 B2 * | 2/2007 | DiFazio ........................ 370/335 |
| 2002/0041575 A1 | 4/2002 | Karabinis et al. |
| 2002/0098842 A1 * | 7/2002 | Antonio et al. ............... 455/442 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0063576 A1 * | 4/2003 | DiFazio ........................ 370/280 |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2004/0066866 A1 | 4/2004 | Tong et al. |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis et al. |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0135058 A1 | 6/2006 | Karabinis |
| 2006/0135060 A1 | 6/2006 | Karabinis |
| 2006/0135070 A1 | 6/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |
| WO | WO 02/31985 A2 | 4/2002 |
| WO | WO 02/067454 A1 | 8/2002 |
| WO | WO 2005/027451 A1 | 3/2005 |

OTHER PUBLICATIONS

Partial International Search Report for PCT/US2006/025701; date of mailing Dec. 21, 2006.

Lim et al., "$3^{rd}$ Generation RACH Transmission—A Candidate," Vehicular Technology Conference, 1999 IEEE $49^{th}$ Houston, TX, USA May 16-20, 1999, Piscataway, NJ, vol. 1, pp. 140-144.

International Search Report, PCT/US2006/025701, Mar. 26, 2007.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

* cited by examiner

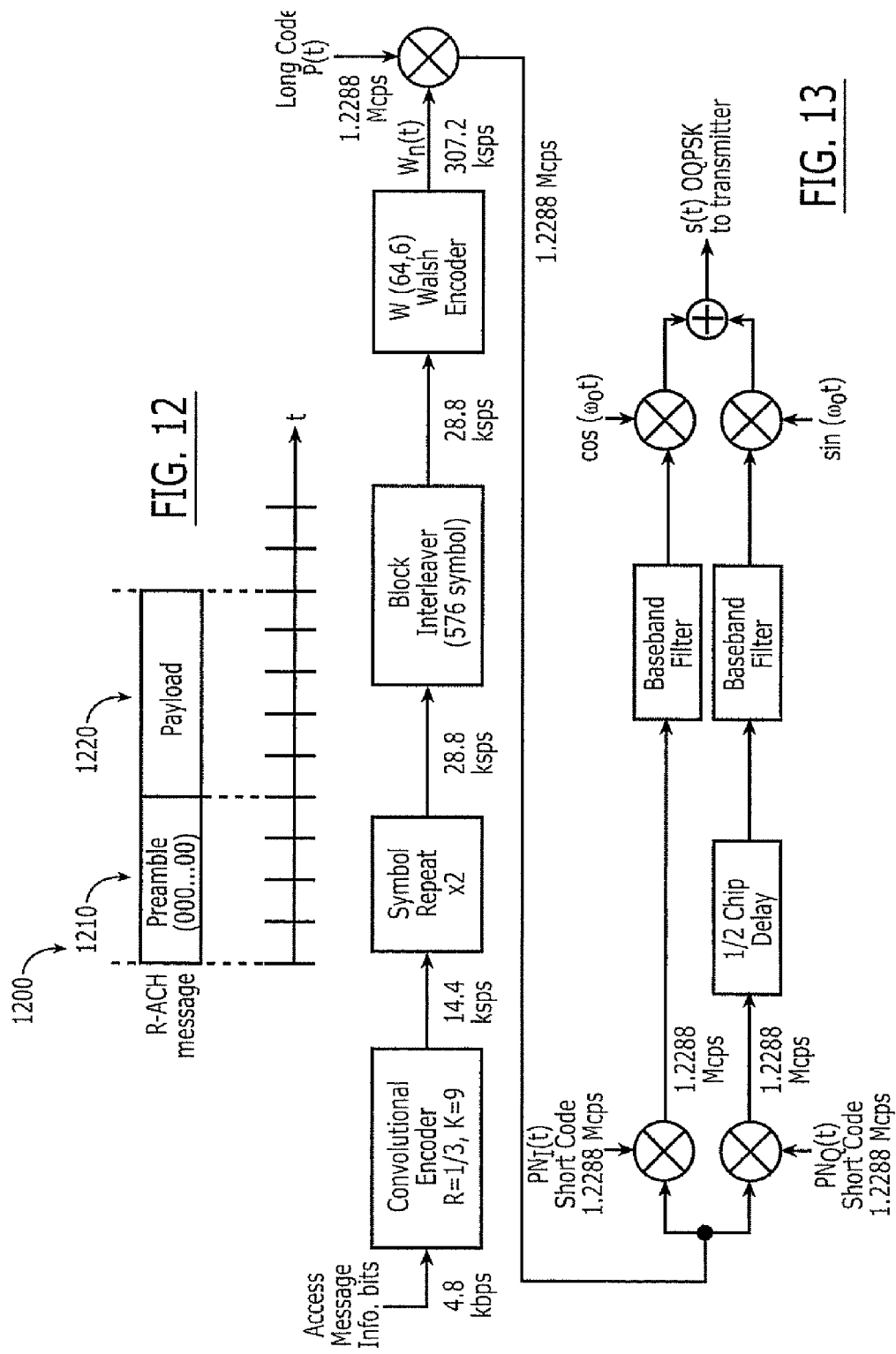

METHODS, APPARATUS AND COMPUTER PROGRAM PRODUCTS FOR JOINT DECODING OF ACCESS PROBES IN A CDMA COMMUNICATIONS SYSTEM

CROSS-REFERENCE TO RELATED APPLICATION

This application claims the priority of U.S. Provisional Application Ser. No. 60/696,574, filed Jul. 5, 2005, incorporated by reference herein in its entirety.

FIELD OF THE INVENTION

This invention relates to wireless communications systems and, more particularly, to apparatus, methods and computer program products for providing access to a wireless communications system.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," or simply as a "terminal". As used herein, the term(s) "radioterminal," "radiotelephone," mobile terminal," "user device" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332. Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/0272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

In some conventional wireless communications systems, a wireless terminal may achieve access by transmitting one or more access request messages to a base station or other node of the system. For example, a reverse access channel may be used by CDMA2000 mobile terminals to request access from a base transceiver station (BTS). A series of access probes (messages) are transmitted, typically repeat transmissions separated in time. A network-defined number of access probes comprise an access sequence. Typically, the power of each successive access probe in an access sequence is incrementally increased, and the BTS attempts to decode the received access probes sequentially. When an access probe is successfully decoded, the BTS transmits an acknowledgment to the mobile terminal (MT). If the MT receives no acknowledgment, it typically retransmits the access sequence up to some specified number of times as part of an overall access attempt.

SUMMARY OF THE INVENTION

Some embodiments of the present invention provide methods of operating a wireless communications system, for example, a CDMA wireless communications system. A signal is received at a component of the wireless communications system, such as a base station or satellite gateway. A plurality of data sets is generated from the received signal, respective ones of the plurality of data sets corresponding to respective access probes. At least some of the data sets are jointly decoded to recover an access probe payload. Receiving of the signal at the component of the wireless communications system may be preceded by transmitting a series of access probes from a radioterminal, and receiving a signal at a component of the wireless communications system may include receiving a radio signal comprising the transmitted series of access probes. In some embodiments, for example, where the reverse service link is noise limited, such as may occur in a satellite communications channel, the access probes may be transmitted from the radioterminal at a substantially uniform power level, e.g., a maximum power level.

In some embodiments, generating a plurality of data sets from the received signal includes detecting access probe preambles in the received signal and generating respective data sets associated with respective ones of the detected access probe preambles. Generating a plurality of data sets from the received signal may further include determining respective timings of the detected access probe preambles and identifying a group of data sets associated with a common radioterminal among the plurality of data sets based on the determined timings, and jointly decoding at least some of the plurality of data sets to recover an access probe payload may include jointly decoding the group of data sets to recover the access probe payload.

In some embodiments, detecting access probe preambles in the received signal includes detecting a pilot code in the received signal, and identifying respective data sets associated with respective ones of the detected access probe preambles includes coherently demodulating and despreading the received signal based on the detected pilot code to generate the plurality of data sets. Generating a plurality of data sets from the received signal may further include determining respective spreading code offsets for respective ones the detected access probe preambles and identifying a group of data sets associated with a common radioterminal among the plurality of data sets based on the determined spreading code offsets. Jointly decoding at least some of the plurality of data sets to recover an access probe payload may include jointly decoding the group of data sets to recover the access probe payload.

In particular, joint decoding of the group of data sets to recover the access probe payload may include symbol-by-symbol summing the data sets of the group of data sets to generate a composite data set and decoding the composite data set to recover the access probe payload. For example, the composite data set may be forward error correction decoded to recover the access probe payload.

In further embodiments of the present invention, generating respective data sets associated with respective ones of the detected access probe preambles includes despreading the received signal responsive to the detected access probe preambles to generate respective data sets associated with respective ones of the access code preambles. Generating a plurality of data sets from the received signal may further include determining respective timings of the detected access probe preambles and identifying a group of data sets associated with a common radioterminal among the plurality of data sets based on the determined timings. Jointly decoding at least some of the plurality of data sets to recover an access probe payload may include jointly decoding the group of data sets to recover the access probe payload. In particular, jointly decoding the group of data sets to recover the access probe payload may include correlating each data set of the group of data sets with each of a set of channel definition codes (e.g., Walsh codes) to generate respective sets of correlations for respective ones of the channel definition codes, summing correlations of respective ones of the sets of correlations to generate respective composite data sets and decoding one of the composite data sets to recover an access probe payload.

Further embodiments of the present invention provide a wireless communications system including at least one component configured to receive a signal, to generate a plurality of data sets from the received signal, respective ones of the plurality of data sets corresponding to respective access probes, and to jointly decode at least some of the plurality of data sets to recover an access probe payload. Additional embodiments provide a radioterminal including a radio transmitter circuit configured to transmit a series of access probes at a substantially uniform power level for use with such a system. The radio transmitter circuit may configured to transmit a series of access probes each of a first series of access probes intended for a first wireless communications system node, e.g., a space-based component, at a substantially uniform power level and to transmit a second series of access probes for a second wireless communications system node, e.g., a terrestrial base station, at incrementally increasing power levels.

Further embodiments provide a computer program product for operation of a wireless communications system, the computer program product including computer program code stored in a storage medium, the computer program code including program code configured to identify a plurality of data sets in a signal, respective ones of the plurality of data sets corresponding to respective access probes and program code configured to jointly decode at least some of the plurality of data sets to recover an access probe payload.

BRIEF DESCRIPTION OF THE DRAWINGS

FIG. 12 illustrates a structure of an access probe that may be used in embodiments of the present invention.

FIG. 13 illustrates a transmitter structure that may be used to develop the access probe of FIG. 12.

DETAILED DESCRIPTION

Figure 1:
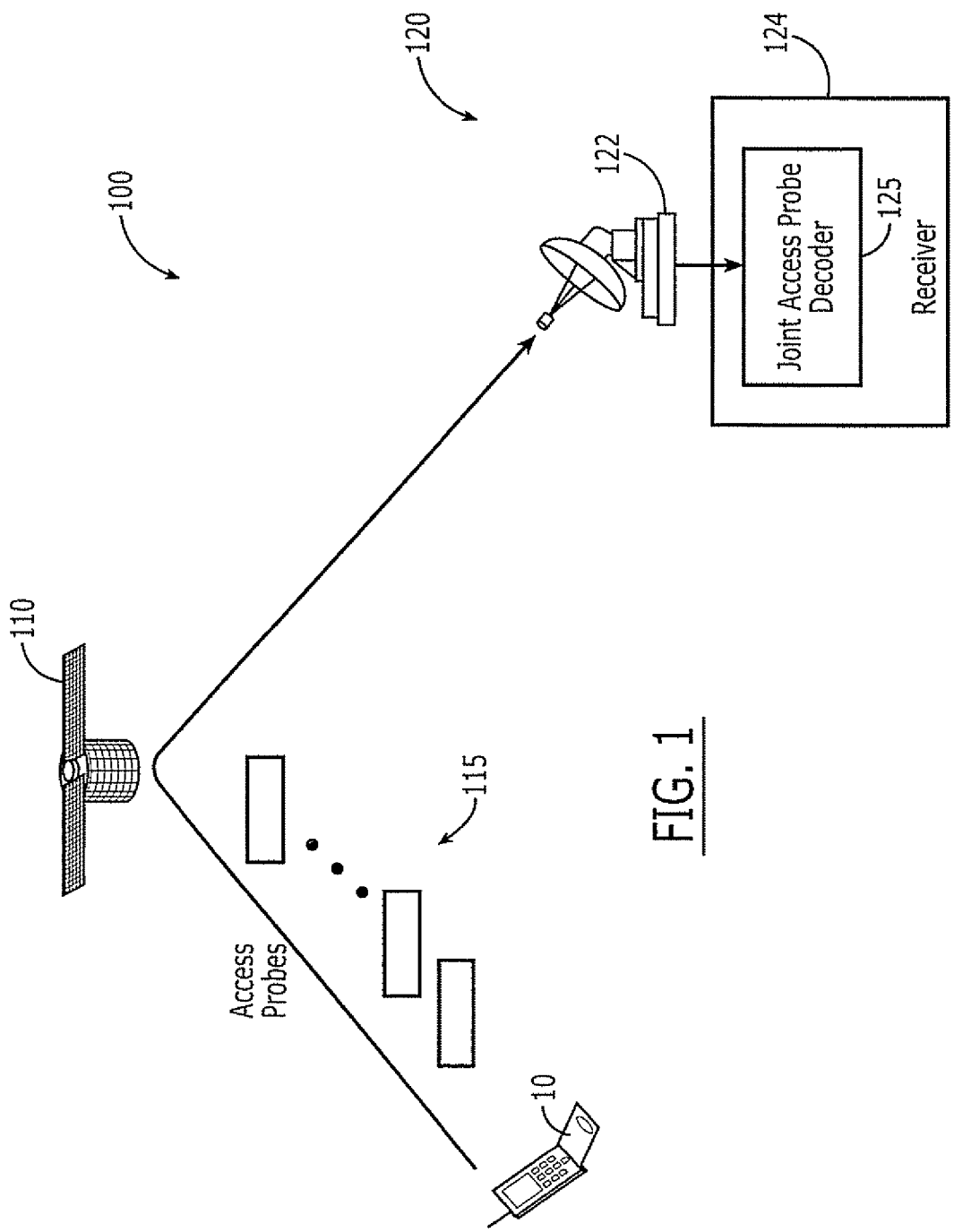
FIG. 1 is a schematic diagram illustrating a wireless communications system and operations thereof according to some embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first radioterminal below could be termed a second radioterminal, and similarly, a second radioterminal may be termed a first radioterminal without departing from the teachings of the present invention. As used herein, the term "and/or" includes any and all combinations of one or more of the associated listed items. The symbol "/" is also used as a shorthand notation for "and/or".

The present invention is described below with reference to block diagrams and/or operational illustrations of methods and apparatus according to embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, DSP, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Computer program code configured to carry out operations according to embodiments of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

FIG. 1 illustrates a wireless communications system 100 according to some embodiments of the present invention. The system 100 includes a space-based component, e.g., a satellite 110, and ground-based infrastructure, here a gateway 120, operatively associated with the satellite 110. The satellite 110 is configured to convey access probes 115, e.g., access request messages, transmitted by a radioterminal 10 to the gateway 120, e.g., using a bent-pipe or other signaling arrangement. In the illustrated embodiments, the gateway 120 includes an antenna 122 and an associated receiver 124. The receiver 124 is configured to receive a signal from the satellite 110 including the access probes 15, and includes a joint access probe decoder 125 configured to recover an access probe payload responsive to the received signal by jointly decoding sets of access probe data extracted from the received signal.

In some embodiments of the present invention, the radioterminal 10 shown in FIG. 1 may be configured to transmit the sequence of access probes 115 to the satellite 110 at a substantially uniform power level. For example, as a satellite application may involve a challenging propagation environment, each of the access probes 115 may be transmitted from the terminal 10 at a maximum power level. In other embodiments, the access probes 115 may be transmitted at different power levels, e.g., at incrementally increasing power levels. In some embodiments, the radio transmitter of the radioterminal 10 may configured to provide transmit access probe sequences at a uniform power level, e.g., a maximum power level, when attempting to communicate with a space-based component (or with a gateway via such a component), but may transmit successive access probes with incrementally increasing power levels when attempting to access a wireless communications system via a terrestrial node, e.g., a terrestrial base station.

Although FIG. 1 illustrates access probe processing apparatus provided in a gateway of a satellite-based communications system, it will be appreciated that the invention may implemented in other ways. For example, in some embodiments of the present invention, joint access probe processing may be implemented in wireless systems without space-based components. Joint access probe processing may also be implemented in one or more components of a satellite communications system other than shown in FIG. 1, such as in a satellite and/or in ground-based infrastructure coupled to a satellite gateway.

Some embodiments of the present invention may address a potential problem that, in a satellite implementation or other transmission environment that is uplink power limited, conventional sequential processing of access probes may produce less than desirable performance. In some embodiments of the present invention, instead of sequentially decoding access probes separately, a series of received access probes may be stored in memory and then combined to provide a composite input to a decoding process, which can thereby increase the probability of successful decoding at low carrier-to-noise ratios. In some embodiments in which access probes are transmitted with a pilot code, phase-coherent combining of successive access probes on a symbol-by-symbol basis may be employed after de-spreading, which may be viewed as a process similar to maximal ratio combining. Such a process may be performed in a satellite gateway receiver, and may require no change to radioterminals or standard access probe message structures. Similar operations without phase-coherent combining may be performed on access probes that do not include a pilot code.

Figure 2:
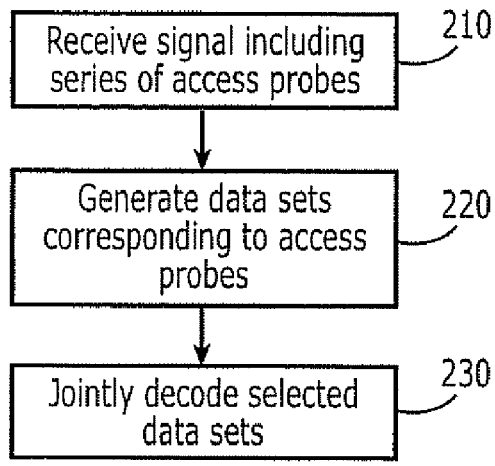
FIGS. 2-4 are flowcharts illustrating exemplary operations of wireless communications systems according to further embodiments of the present invention.

According to some embodiments of the present invention illustrated in FIG. 2, a signal including a series of access probes is received at a component of a wireless communications system (block 210). Respective data sets corresponding to respective access probes are generated from the received signal (block 220). Selected ones of the data sets are jointly decoded to recover an access probe payload (block 230).

Figure 3:
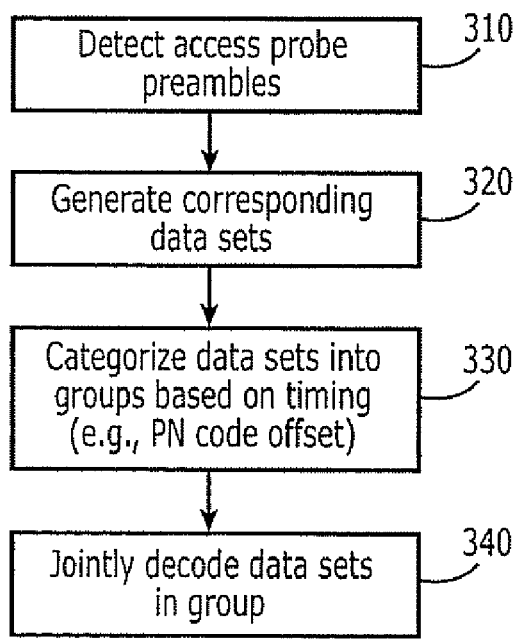

Referring to FIG. 3, in some embodiments, access probes are detected by detecting access probe preambles (block 310). Data sets corresponding to respective ones of the access probe preambles are generated (block 320). The data sets are categorized into at least one group based on timing thereof e.g., based on relative spreading (e.g., PN) code offset (block 330). Data sets in a given group are jointly decoded to recover an access probe payload (block 340).

Figure 4:
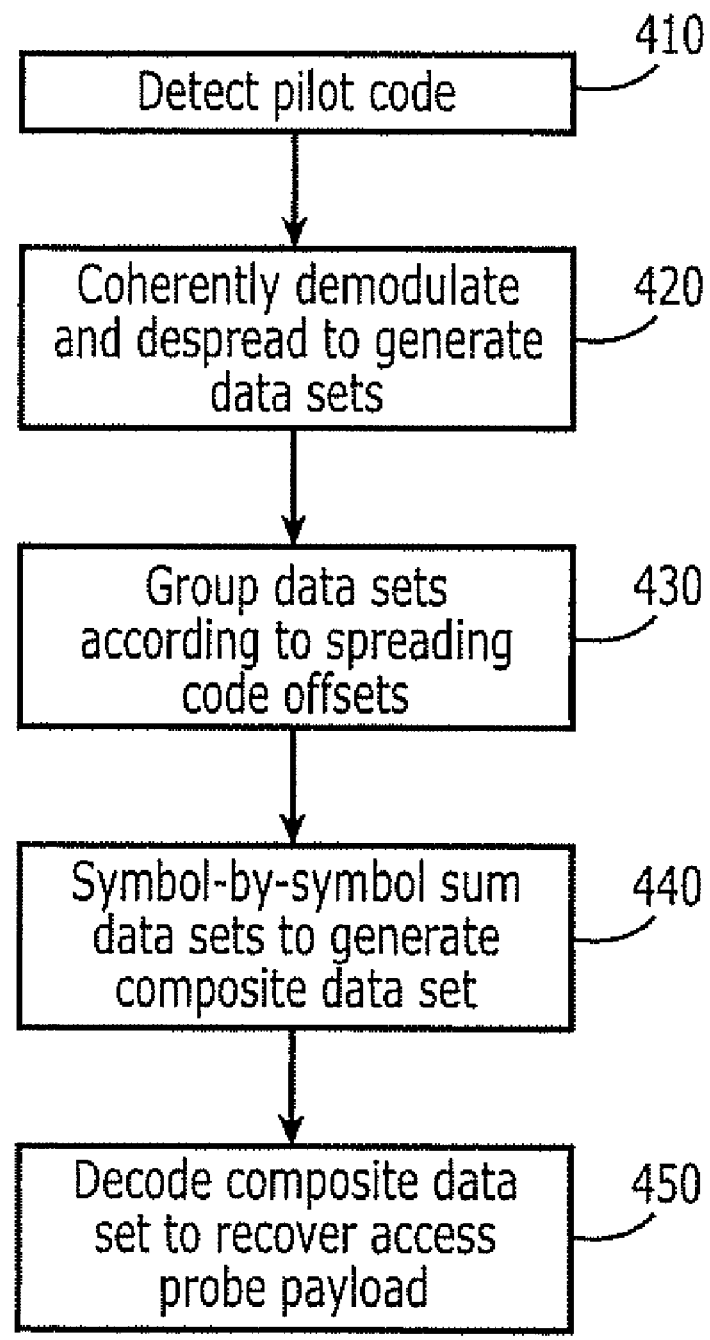

As discussed above, in some embodiments of the present invention, a signal including access probes with a pilot code may be coherently demodulated to generate data sets corresponding to respective access probes. Referring to FIG. 4, a pilot code is detected in a received signal (block 410). The receiver may then synchronize to the detected pilot code to coherently demodulate and despread the received signal and generate data sets corresponding to respective access probes (block 420). The data sets may be grouped according to spreading code offsets thereof, e.g., data sequences having substantially the same spreading code offset may be grouped together (block 430). The data sets in a group may then be combined on a symbol-by-symbol basis after despreading to generate a composite data set that reflects information from multiple access probes (block 440). This composite data set may be decoded (e.g., de-interleaved and forward error correction decoded) to recover an access probe payload (block 450).

Figure 5:
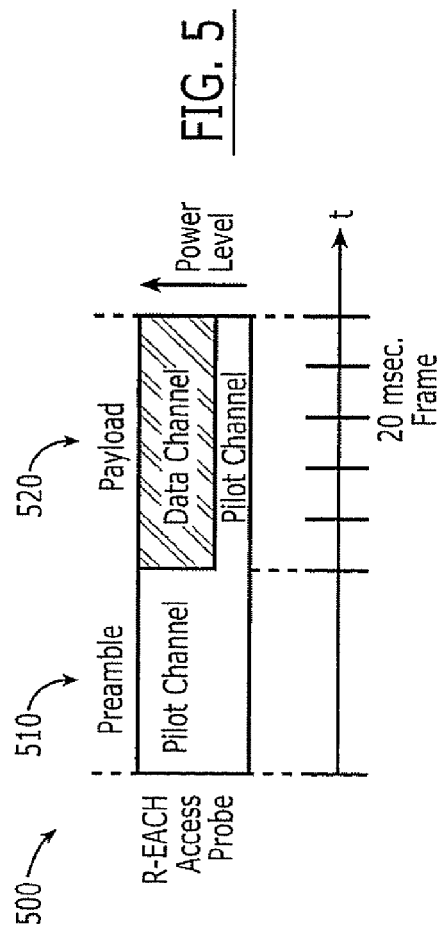
FIG. 5 illustrates a structure of an access probe that may be used in embodiments of the present invention.

FIGS. 5-10 illustrate exemplary implementation of operations for access probes transmitted over a CDMA2000 reverse enhanced access channel (R-EACH) according to some embodiments of the present invention. A message structure of an individual R-EACH access probe 500 is shown in FIG. 5. It begins with a preamble 510 of network-defined length that is simply the reverse pilot channel, used by the receiver for acquiring code synchronization. Following the preamble is a message payload 520 including a number of 20 millisecond (msec) frames that carry information. During message transmission, the reverse pilot channel is still present, but its power is reduced well below the data channel.

A theoretical analysis of a process for recovering an access probe payload from a series of such access probes will now be presented with reference to FIGS. 6-10. It will be appreciated that the theoretic model described below is provided to facilitate understanding of certain embodiments of the present invention, but that the invention is not limited to the theoretical model described.

Figure 6:
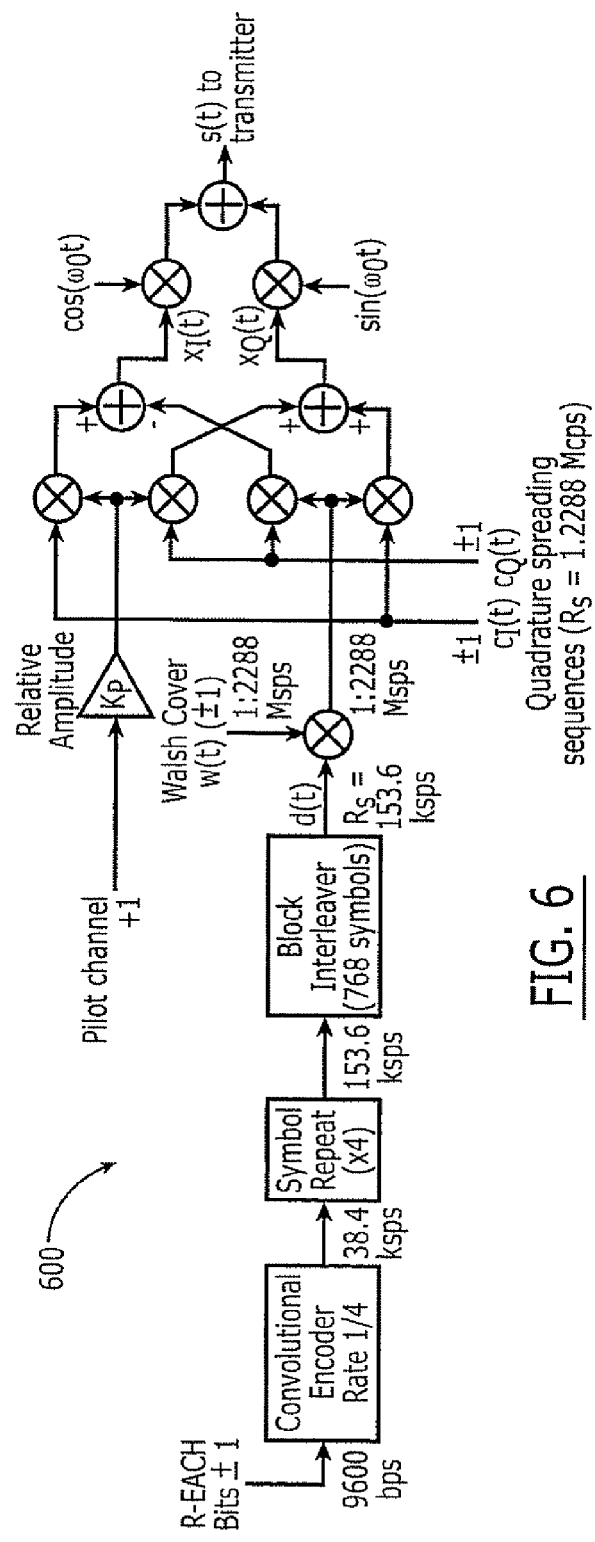
FIG. 6 illustrates a transmitter structure that may be used to develop the access probe of FIG. 5.

FIG. 6 is a simplified block diagram illustrating a CDMA2000 R-EACH encoding and modulation apparatus 600 and operations thereof, where bit and symbol levels are in bipolar format (i.e., 0→+1, 1→−1). After forward error correction (FEC) encoding, symbol repetition, and interleaving, each symbol in data sequence d(t) is initially spread using a Walsh code pattern w(t) at a rate of 8 Walsh symbols for each data symbol. The pilot channel, which is comprised of +1 symbols, is adjusted by amplitude factor $K_P$ relative to the data channel amplitude. Both pilot and data channels are then modulated by quadrature spreading sequences $c_I(t)$ and $c_Q(t)$, which are functions of the long and short PN codes, followed by radio frequency (RF) modulation to produce the transmitted waveform s(t).

From FIG. 6, the transmitted access probe signal s(t) is given by:

$$s(t) = x_I(t)\cos(\omega_0 t) + x_Q(t)\sin(\omega_0 t) \quad (1)$$

where:

$$x_I(t) = K_P c_I(t) - d(t)w(t)c_Q(t) \quad (2)$$

$$x_Q(t) = K_P c_Q(t) + d(t)w(t)c_I(t) \quad (3)$$

and:

d(t)≡data channel waveform (±1, symbol rate $R_S$=153.6 ksps).

$K_P$≡pilot channel amplitude relative to the data channel (<1).

w(t)≡Walsh cover modulation (±1, symbol rate=1.2288 Msps).

$c_I(t)$, $c_Q(t)$≡quadrature spreading codes (±1, chip rate $R_C$=1.2288 Mcps).

Figure 7:
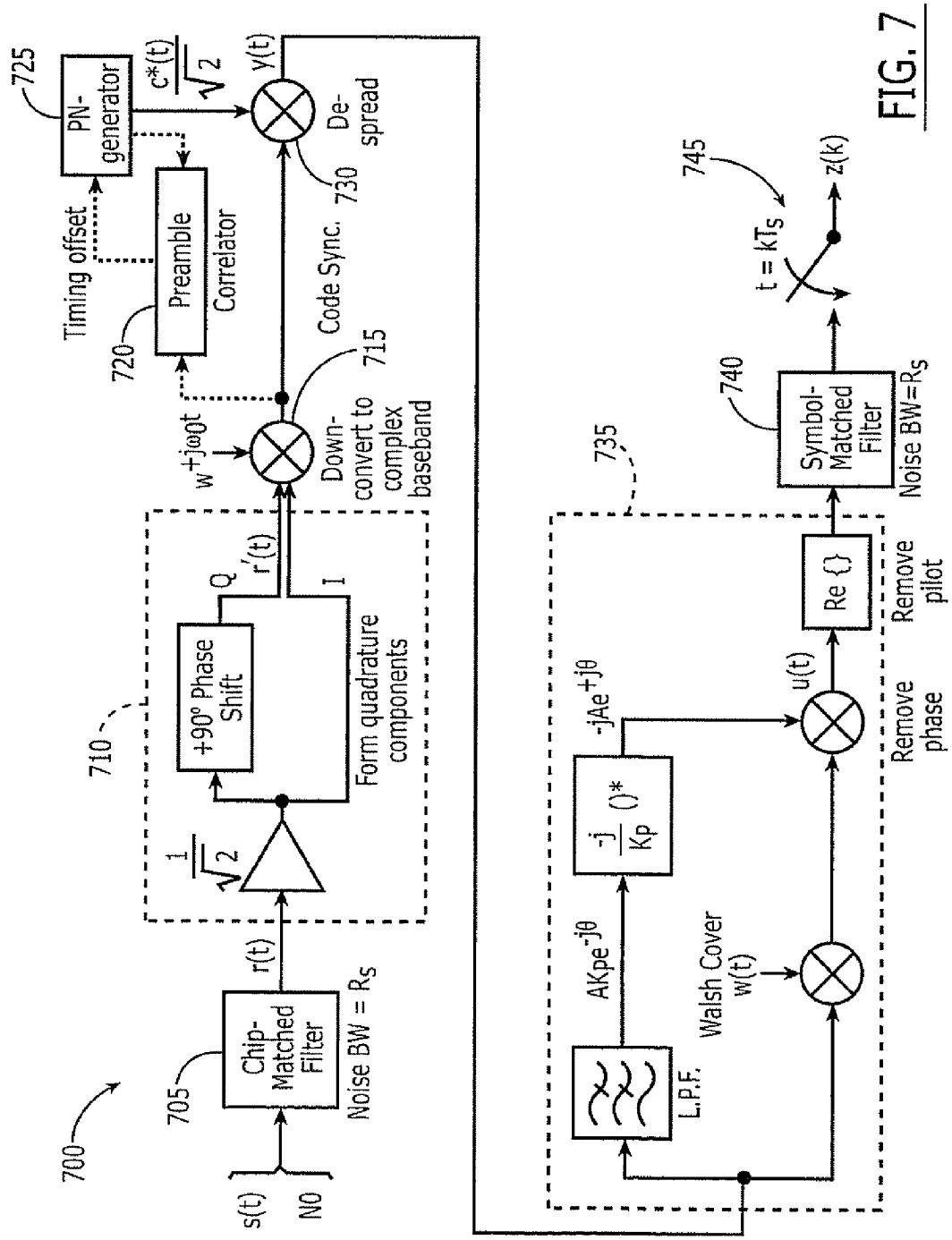
FIGS. 7 and 8 illustrate receiver structures and operations thereof according to some embodiments of the present invention.

FIG. 7 illustrates a front-end portion 700 of a receiver according to some embodiments of the present invention. A received waveform r(t), after input filtering by a chip-matched filter 705, includes a signal component $s_R(t)$, which is proportional to the transmitted s(t) with added random phase shift θ, plus channel noise n(t):

$$r(t) = s_R(t) + n(t) \quad (4)$$

where:

$$s_R(t) = A[x_I(t)\cos(\omega_0 t+\theta) + x_Q(t)\sin(\omega_0 t+\theta)] \quad (5)$$

$$n(t) = n_I(t)\cos(\omega_0 t+\theta) + n_Q(t)\sin(\omega_0 t+\theta) \quad (6)$$

Quadrature noise terms $n_I(t)$ and $n_Q(t)$ may be viewed as independent zero-mean Gaussian random processes with variance N0$R_C$, where N0 is the channel noise power density and $R_C$ is the chip rate:

$$n_I(t), n_Q(t) \to A(\mu=0, \sigma^2=N0R_C) \quad (7)$$

A quadrature signal generator 710 constructs a complex representation by splitting the power of r(t) into 2 paths, and phase shifts one of the paths by +90° to form I and Q channels. These two channels can be collectively represented as an equivalent complex waveform r'(t), whose real and imaginary parts are the I- and Q-components, respectively:

$$r'(t) = s_R'(t) + n'(t) \quad (8)$$

where:

$$s_R'(t) = (A/\sqrt{2})\{[x_I(t)\cos(\omega_0 t+\theta) + x_Q(t)\sin(\omega_0 t+\theta)] + \quad (9)$$
$$j[x_I(t)\cos(\omega_0 t+\theta+90°) + x_Q(t)\sin(\omega_0 t+\theta+90°)]\}$$
$$= (A/\sqrt{2})[x_I(t) + jx_Q(t)]e^{-j(\omega_0 t+\theta)}$$

Substituting (2) and (3) into (9) and simplifying yields:

$$s_R'(t) = (A/\sqrt{2})[K_P + jw(t)d(t)]c(t)e^{-j(\omega_0 t+\theta)} \quad (10)$$

where:

$$c(t) = c_I(t) + jc_Q(t) \quad (11)$$

Similarly, the complex noise term n'(t) in (11) can be expressed as:

$$n'(t) = (1/\sqrt{2})[n_I(t) + jn_Q(t)]e^{-j(\omega_0 t+\theta)} = [n'_I(t) + jn'_Q(t)]e^{-j(\omega_0 t+\theta)} \quad (12)$$

where:

$$n'_I(t), n'_Q(t) \to A(\mu=0, \sigma^2=N0R_C/2) \quad (13)$$

Beginning at r'(t) in FIG. 7, the signal path includes both I- and Q-paths, but for simplicity is shown as a single line in the figure.

As shown in FIG. 7, r'(t) is down-converted to complex baseband by a downconverter 715 and de-spread by a despreader 730, by multiplication by $e^{+j\omega_0 t}$ and $c^*(t)/\sqrt{2}$ respectively, to produce waveform y(t):

$$y(t) = [s_R'(t) + n'(t)]e^{+j\omega_0 t} c*(t)/\sqrt{2} \quad (14)$$
$$= AK_P e^{-j\theta} + jAw(t)d(t)e^{-j\theta} + [\eta_I(t) + j\eta_Q(t)]e^{-j\theta}$$

where:

$$\eta_I(t) = (1/\sqrt{2})[n'_I(t)c_I(t) + n'_Q(t)c_Q(t)] \quad (15)$$

$$\eta_Q(t) = (1/\sqrt{2})[n'_Q(t)c_I(t) - n'_I(t)c_Q(t)] \quad (16)$$

$\eta_I(t)$ and $\eta_Q(t)$ are assumed independent zero-mean Gaussian noise terms with variance N0$R_C$/2.

The de-spreading involves synchronizing the receiver to the spreading code of the received access probe. This may be achieved by a correlator 720 that correlates the R-EACH message preamble against the range of possible timing offsets of the receiver's PN reference code generated by a PN generator 725. The offset with the highest correlation peak is selected, as shown by dashed lines in FIG. 7. The preamble length may be defined by the network, so it may be set as large as needed to ensure reliable synchronization.

The term y(t) in (14) contains a constant term $AK_P e^{-j\theta}$, which results from de-spreading the pilot channel, so the received access probe amplitude A and phase θ may be determined by low-pass filtering y(t), as shown in FIG. 7.

Walsh modulation w(t) and received phase θ are removed from y(t) in a channel decoder 735, producing the waveform u(t):

$$u(t) = -jAe^{+j\theta}w(t)y(t) \quad (17)$$
$$= -jA^2 K_P w(t) + A^2 d(t) + Aw(t)\eta_Q(t) - jAw(t)\eta_I(t)$$

The imaginary part of u(t) is removed, and the real part passed through a filter 740 matched to the symbol waveform d(t). A sampler 745 samples at each symbol time $kT_S$ (k=1, 2, ... ), producing an output sequence z(k):

$$z(k) = A^2 d(k) + \eta'(k), (k=1, 2, \ldots) \quad (18)$$

where d(k)=±1, and the η'(k) noise terms are independent zero-mean random variables:

$$\eta'(k) \to A(\mu=0, \sigma^2 = A^2 N0 R_S/2) \quad (19)$$

The term $R_S$ in (19) results from the matched filtering, and is equal to the de-spread symbol rate ($R_S=1/T_S=153.6$ kHz).

The output sequence z(k) in FIG. 7, corresponding to the $k^{th}$ symbol of the transmitted data sequence d(t) (where $t=kT_S$, k=1, 2 ... ) can be expressed as:

$$z(k) = A^2 d(k) + \eta'(k), (k=1, 2 \ldots) \quad (20)$$

where A is the received data channel amplitude, transmitted symbol d(k)=±1, and the η'(k) noise terms are zero-mean Gaussian random variables, statistically independent over all k;

$$\eta'(k) \to A(\mu=0, \sigma^2 = A^2 N0 R_S/2) \quad (21)$$

where:
  N0≡total received channel noise plus interference density.
  $R_S$≡de-spread symbol rate (153.6 ksps).

Figure 8:
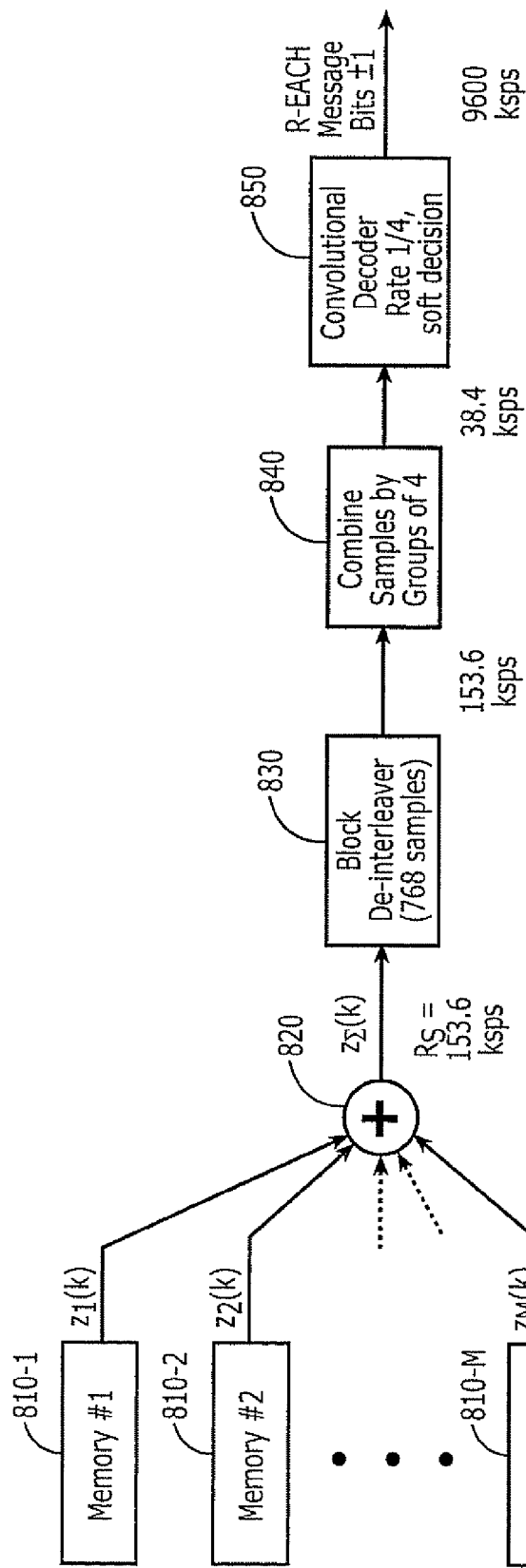

Referring to FIG. 8, the receiver may store z(k) samples for M access probes associated with a given source, e.g., a mobile terminal, in memories 810-1, 810-2, ..., 810-M. The stored samples may be coherently combined on a symbol-by-symbol basis by a combiner 820. This may be followed by de-interleaving by a deinterleaver 830, redundant symbol combining in a combiner 840, and convolutional decoding by a convolutional decoder 850 to recover message bits.

In this analysis, it is assumed that the access probes corresponding to the data (sample) sets being combined contain identical information bits. This may ensure that the same d(k) symbol sequences are transmitted for each access probe, so they can be coherently combined. The spreading code overlays may be different between access probes, but the spreading modulation is removed prior to combining, so this may have little or no effect.

Letting $z_m(k)$ be the signal-plus-noise sample from received access probe m ($1 \leq m \leq M$), then;

$$z_m(k) = A_m^2 d(k) + \eta'_m(k), (k=1, 2 \ldots) \quad (22)$$

where $A_m$ is the received data channel amplitude from access probe m, and:

$$\eta'_m(k) \to A(\mu_m=0, \sigma m^2 = A_m^2 N0 R_S/2), \quad (23)$$

statistically independent over all m and k.

Summing contributions from M access probe data sets to form a composite sample $z_\Sigma(k)$:

$$z_\Sigma(k) = d(k) \sum_{m=1}^{M} A_m^2 + \eta'_\Sigma(k) \quad (24)$$

where $\eta'_\Sigma(k)$ is a zero-mean Gaussian random variable with variance:

$$\sigma_\Sigma^2 = (N0 R_S/2) \sum_{m=1}^{M} A_m^2 \quad (25)$$

Letting $S_\Sigma$ be the desired signal power in sequence $z_\Sigma(k)$, from (27):

$$S_\Sigma = \left( \sum_{m=1}^{M} A_m^2 \right)^2 \quad (26)$$

The noise plus interference power $N_\Sigma$ in $z_\Sigma(k)$ is the variance $\sigma_\Sigma^2$, which may be given by (25). The signal-to-noise power ratio is formed by dividing (26) by (25), and simplifying:

$$(S/N)_\Sigma = S_\Sigma / \sigma_\Sigma^2 = 2 \left( \sum_{m=1}^{M} A_m^2 \right) / (N0 R_S) \quad (27)$$

From (22) and (23), the signal power $S_m$, noise power $N_m$, and signal-to-noise power ratio $(S/N)_m$ associated with received access probe m are given by:

$$S_m = A_m^4 \quad (28)$$

$$N_m = \sigma_m^2 = A_m^2 N0 R_S/2 \quad (29)$$

$$(S/N)_m = 2 A_m^2 / (N0 R_S), (1 \leq m \leq M) \quad (30)$$

Substituting (30) into (27) yields:

$$(S/N)_\Sigma = \sum_{m=1}^{M} (S/N)_m \quad (31)$$

The combined $(S/N)_\Sigma$ (or equivalently $(Es/N0)_\Sigma$) may be seen as equal to the sum of the signal-to-noise ratios from the M received access probes. Therefore, the joint processing may be viewed as equivalent to maximal ratio combining of the data sets for the M access probes. If it is assumed that all access probes have the same received Es/N0, then combining 4 access probes may result in a 6 dB improvement in $(Es/N0)_\Sigma$, combining 8 access probes may provide a 9 dB improvement, etc.

Performance differences between conventional sequential decoding of access probes and the above-described joint-combining technique will now be discussed. Pr{success} may designate the probability that a R-EACH message is successfully received from an access sequence containing M access probes where, for the message to be successfully recovered, all information bits are decoded correctly. $Pr_M\{b\}$ may represent the information bit error probability at the output of the convolutional decoder shown in FIG. 8. Then:

$$Pr\{\text{success}\} = (1 - Pr_M\{b\})^{192F} \text{ (for joint decoding)} \quad (32)$$

where F is the number of frames in the access probe message capsule (payload), with each frame containing 192 bits. $Pr_M\{b\}$ can be determined for a given receive channel Ebi/N0 from the transfer function of the rate-¼ Viterbi decoding algorithm for an input SNR of MEbi/N0, where the factor M is the result of maximal ratio combining of the M access probes. For this analysis, the transfer function for the rate-¼ Viterbi decoder was not available, so an upper bound estimate for a rate-⅓ soft-decision Viterbi decoder was used instead. Consequently, the analytical results that follow may be slightly pessimistic.

Letting Pr{fail} be the probability that the receiver fails to decode the R-EACH message:

$$Pr\{\text{fail}\} = 1 - Pr\{\text{success}\} \quad (33)$$

$$= 1 - (1 - Pr_M\{b\})^{192F} \text{ (for joint decoding)}$$

Figure 9:
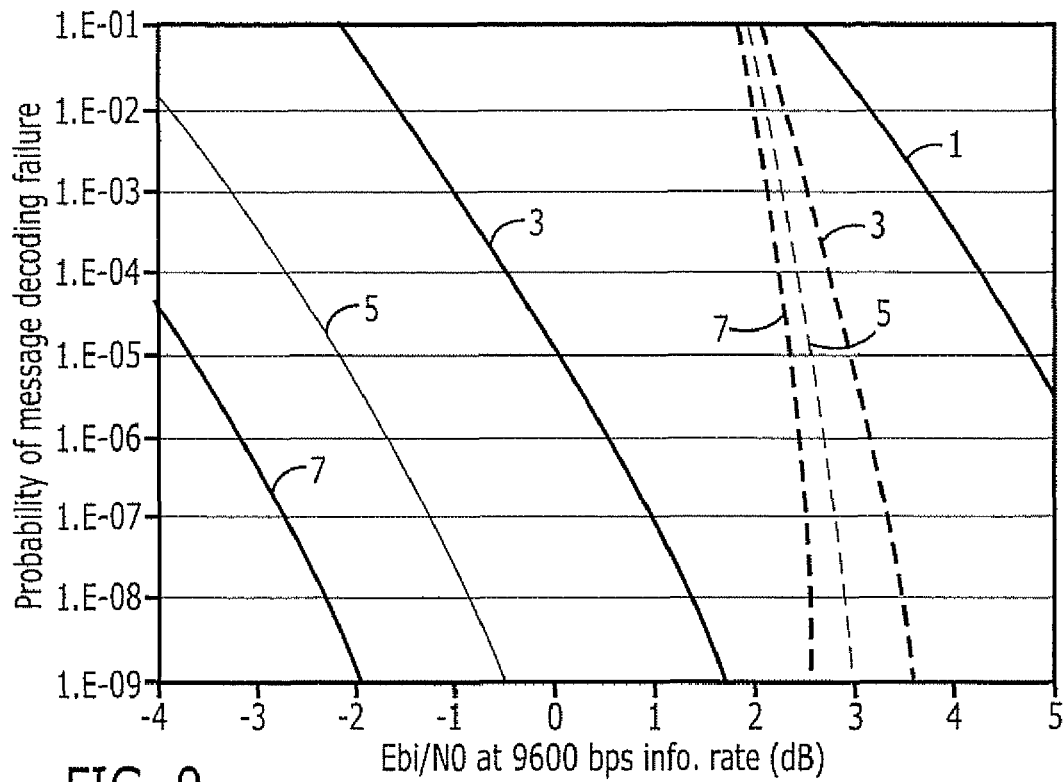
FIG. 9 illustrates operations for discriminating among access probes according to some embodiments of the present invention.

For sequential decoding, Pr{success} requires that at least one of the M access probes be correctly decoded. Hence Pr{fail} is the joint probability that the receiver sequentially fails to decode all M access probes. This probability can be expressed as:

$$Pr\{\text{fail}\}=[1-(1-Pr_I\{b\})^{192F}]^M \text{ (for sequential decoding)} \quad (34)$$

where $Pr_I\{b\}$ may represent the information bit error probability for a single access probe without joint combining. In FIG. 9, computed Pr{fail} is plotted versus Ebi/N0 for both sequential (dashed curves) and joint (solid curves) decoding methods, for values of M=1, 3, 5, 7 and 9 and F=3 message frames. For this example, it is assumed that the received power levels from all access probes are equal.

For a satellite network, for example, a return traffic channel information rate as low as 2400 bps may be implemented. Assuming a minimum Ebi/N0 of about 3 dB to close the link at 2400 bps, this would translate to −3 dB at the R-EACH information rate of 9600 bps for the same transmitted EIRP. Therefore R-EACH Ebi/N0 levels as low as −3 dB may be of interest for satellite operation. Even at these low levels, joint decoding as described above using M equal to 5 or 7 combined access probes may provide acceptable performance. However, a sequential decoding technique may fail at these low Ebi/N0 levels.

At a given time, several sources (e.g., mobile terminals) may be using the R-EACH simultaneously, each transmitting its own sequence of access probes. Therefore, it is desirable that the receiver determine which received access probes belong to each source, so they can be combined accurately. According to some embodiments of the present invention, this may be accomplished by measuring the received timing offset of each access probe's spreading (e.g., PN) sequence, and combining those access probes whose spreading code offsets translate to the same range distance.

In a typical CDMA system, each radioterminal may synchronize its internal PN-generator to timing information received from the network, which is offset from true network time by the propagation delay between and mobile terminal and the receiving component of the system, e.g., base station or gateway. In systems such as that illustrated in FIG. 1, when a radioterminal transmits on the R-EACH, the system gateway may receive the radioterminal's spreading code delayed by two satellite traversals relative to true network time. The delay dispersion within a beam coverage area may show up as differences in the spreading code timing offsets of the received access probes, which may be hundreds or even thousands of chip periods. However, for a geosynchronous satellite, access probes belonging to the same radioterminal may have nearly identical timing offsets, as the range to the terminal typically will not have changed significantly during transmission. Because PN-sequences are typically uncorrelated, the receiver may distinguish and separate simultaneous transmissions from different radioterminals whose received PN offsets differ by 1 or more chip periods.

Figure 10:
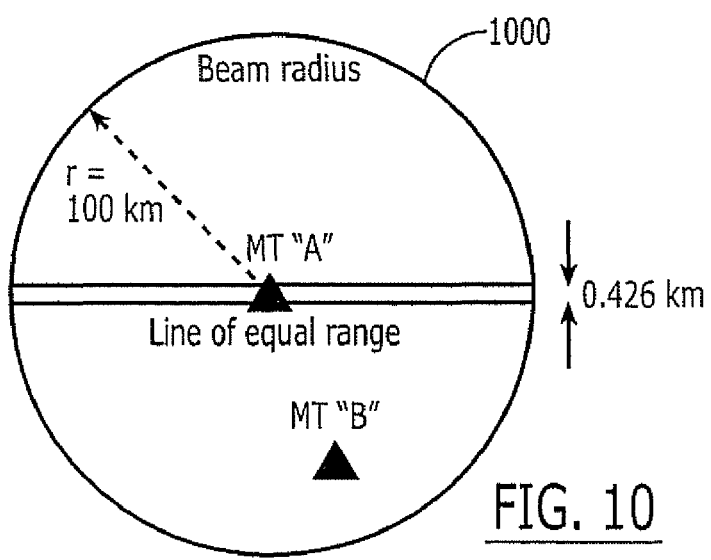
FIG. 10 illustrates simulated performance in access probe acquisition according to some embodiments of the present invention.

The probability that the receiver incorrectly combines access probes from different radioterminals may therefore be equal to the probability that their total path delays differ by less than 1 chip period. To explain the unlikelihood of this event in a satellite communications system, an example is shown in FIG. 10. A satellite spot beam 1000 with radius of 100 km is centered at 30° N. latitude and the same longitude as a geosynchronous satellite. Points of equal range distance to the satellite may be approximated by a straight line passing through the beam footprint, whose line width corresponds to a path delay difference of ±1 chip, or about 426 m. The probability that two simultaneous access probes "collide" (that is, whose PN offsets differ by less than 1 chip period) is approximately equal to the probability that the two MTs lie on the same equal-range line. The longest equal-range line segment passes through the beam center, so this probability may be upper-bounded by the conditional probability that the access probes collide given that one MT is located at the beam center.

Letting the location of MT "B" be a uniformly distributed random variable within the beam 1000, the probability that MT "B" and MT "A" timing offsets differ by less than 1 chip is approximately equal to the ratio of the shaded area in FIG. 10 to the area of the circle. Hence:

$$Pr\{\text{collision}\} \leq Pr\{\text{collision} | MT \text{ "A" at beam center}\} \quad (35)$$
$$= (200)(0.426)/(\pi 100^2)$$
$$= 0.0027$$

Thus, the probability that the receiver incorrectly combines access probes from 2 different MTs randomly located within a spot beam may be much less than 1% in the present example. This assumes that the two MTs begin their transmissions in the same R-EACH slot, whose slot size is generally set equal to the preamble length. Overlapping transmissions that begin in different slots are assigned different PN-code offsets, hence these transmissions will not likely collide even if the MTs are located on the same equal range line. This may further reduce the probability of R-EACH access probe collisions.

Figure 11:
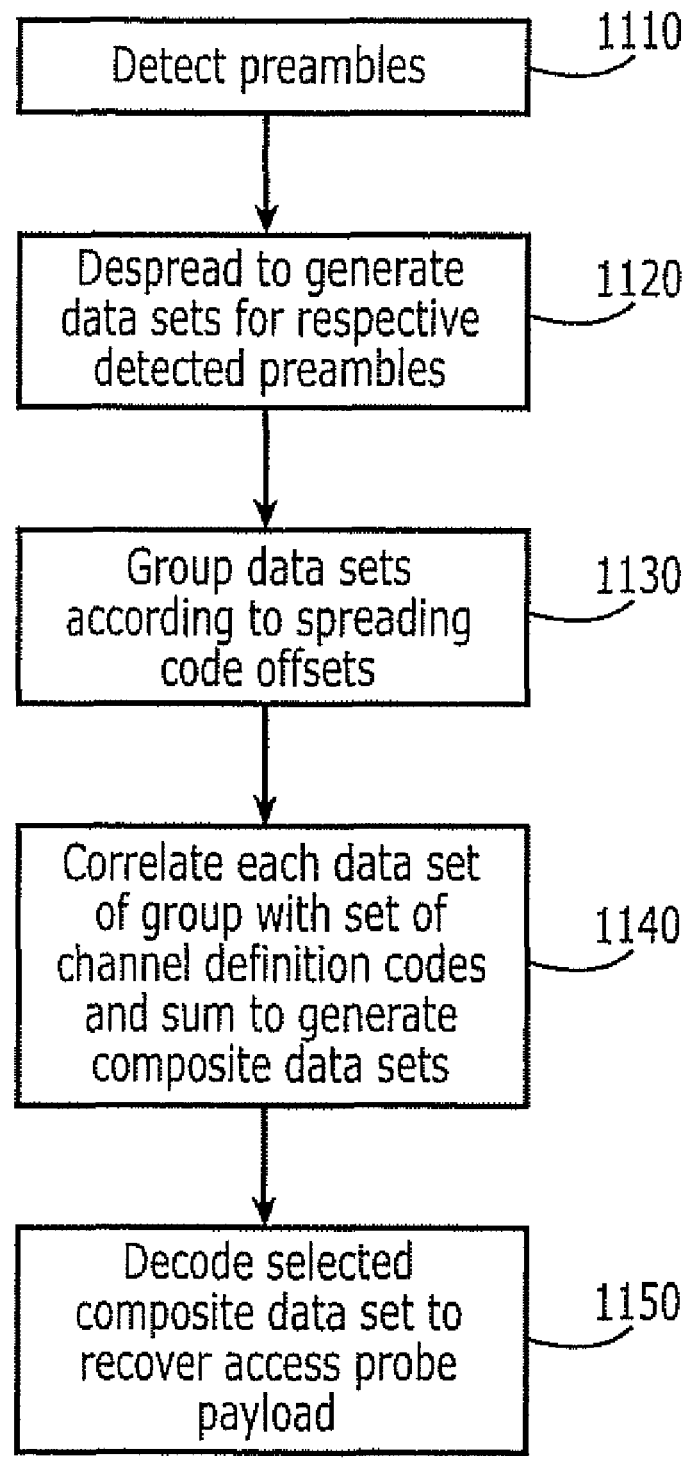
FIG. 11 is a flowchart illustrating exemplary operations of a wireless communications system according to further embodiments of the present invention.

As noted above, in some embodiments of the present invention, access probe data may be jointly decoded without phase-coherent combining. Referring to FIG. 11, a received signal, e.g., access probe preambles are detected in received signal, e.g., a signal received at a satellite gateway from a satellite that serves a cell in a satellite mobile communications system (block 1110). The received signal is despread according to a spreading code to generate data sets associated with access probe payloads associated with the preambles (block 1120). The data sets are grouped according to their associated spreading code offsets (block 1130). Data sets of a group are correlated with each of the channel definition codes, and the correlations for respective ones of the channel definition codes are summed to generate respective composite data sets for the channel definition codes (block 1140). A selected one of the composite data sets is decoded to recover an access probe payload (block 1150).

FIGS. 12-19 illustrate exemplary implementation of operations for access probes transmitted over a CDMA2000 or IS-95 access channel (R-ACH) according to some embodiments of the present invention. A message structure of an individual R-ACH access probe 1200 is shown in FIG. 12. It includes an integer number of 20 msec. frames. The beginning contains a preamble 1210 of network-defined length that carries no data (all-zero info. bits), used by a receiver for acquiring code phase synchronization. Following the preamble 1210 is a payload 1220 that carries information. No pilot channel is provided for the R-ACH.

Exemplary encoding and modulation operations for the R-ACH information bits are shown in FIG. 13, where bit and symbol levels are assumed to be in bipolar format (i.e., 0→+1, 1→−1). The information bits at 4800 bps are rate-⅓ FEC-encoded to 14.4 ksps. Then 2× symbol repetition is applied to bring the symbol rate to 28.8 ksps, followed by block interleaving. At this point, the symbols are fed into a Walsh encoder in groups of 6. The Walsh encoder maps the 6 symbols to one of $2^6=64$ orthogonal Walsh code words, denoted $w_n(t)$ ($1 \leq n \leq 64$) in FIG. 13, with each word containing 64 binary symbols. This increases the symbol rate by a factor of 64/6 to 307.2 ksps. The transmitted Walsh word $w_n(t)$ ($1 \leq n \leq 64$) is then spread by the long code and short code PN sequences at a rate of 4 chips per Walsh symbol, resulting in the final spread chip rate of 1.2288 Mcps. The short code contains both I- and Q-PN-sequences to generate separate I-channel and Q-channel spreading. The Q-channel is delayed by ½-chip so that offset-QPSK modulation is produced at the transmitted output signal s(t).

A theoretical analysis of a process for recovering an access probe payload from a series of such access probes will now be presented with reference to FIGS. 13-23. It will be appreciated that the theoretic model described below is provided to facilitate understanding of certain embodiments of the present invention, but that the invention is not limited to the theoretical model described.

Figure 14:
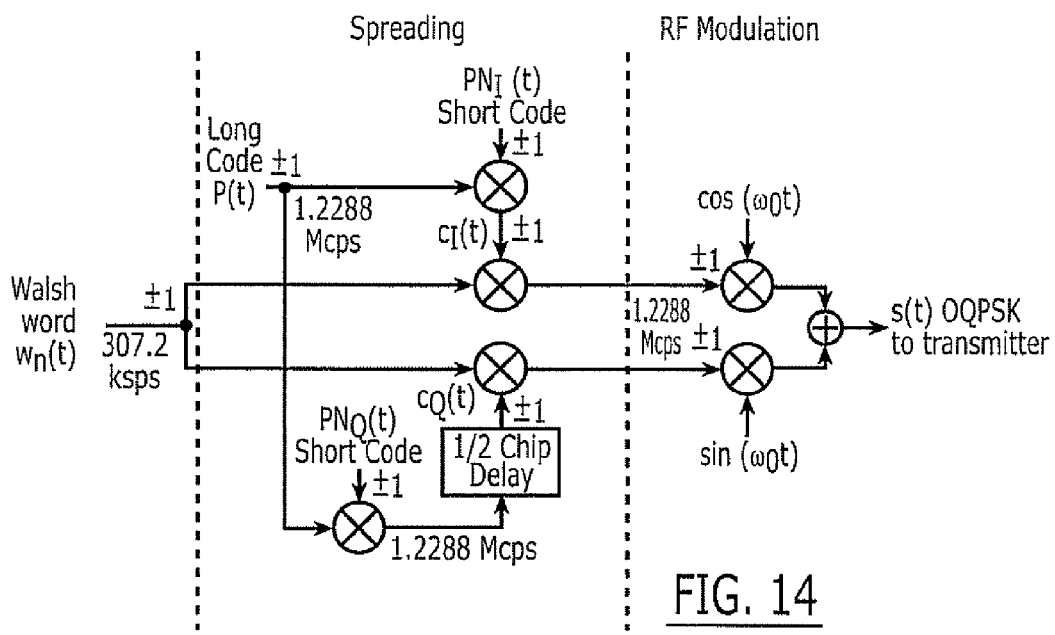
FIG. 14 illustrates an approximation of the receiver structure of FIG. 13.

To reduce mathematical complexity, a simplified approximation of the transmitter's spreading process may be made, as shown in FIG. 14. The output RF waveform s(t) can be expressed as:

$$s(t) = w_n(t)[c_I(t)\cos(\omega_0 t) + c_Q(t)\sin(\omega_0 t)] \quad (36)$$

where:

$$c_I(t) = P(t)PN_I(t) \quad (37)$$

$$c_Q(t) = P(t - T_c/2)PN_Q(t - T_c/2), \ (T_c = \text{chip duration}) \quad (38)$$

and the waveforms $w_n(t)$, $c_I(t)$, and $c_Q(t)$ can each take on values of ±1.

Figure 15:
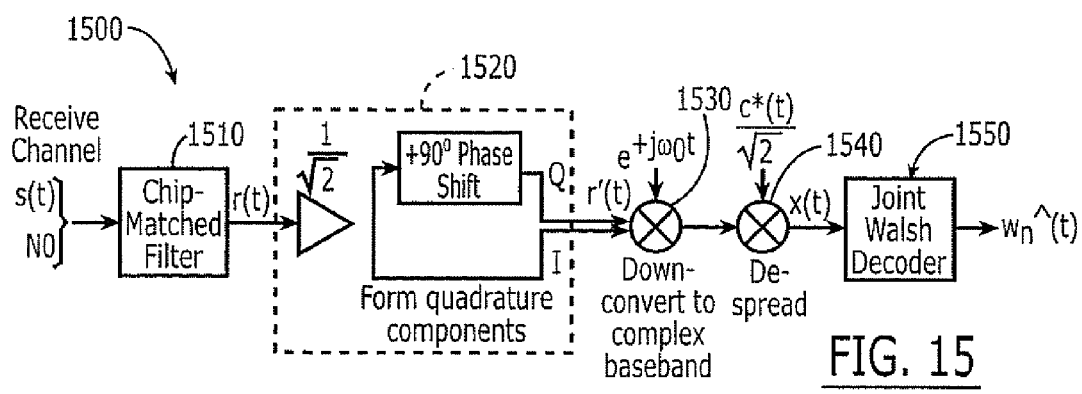
FIGS. 15-19 illustrate receiver structures and operations thereof according to some embodiments of the present invention.

A front end portion 1500 of a receiver according to some embodiments of the present invention is shown in FIG. 15. After filtering by a chip-matched filter 1510, a received waveform r(t) includes a signal component $s_R(t)$, which is proportional to the transmitted s(t) with added unknown phase shift θ, plus channel noise n(t):

$$r(t) = s_R(t) + n(t) \quad (39)$$

where:

$$s_R(t) = Aw_n(t)[c_I(t)\cos(\omega_0 t + \theta) + c_Q(t)\sin(\omega_0 t + \theta)] \quad (40)$$

$$n(t) = n_c(t)\cos(\omega_0 t) + n_s(t)\sin(\omega_0 t) \quad (41)$$

Noise components $n_c(t)$ and $n_s(t)$ are independent zero-mean Gaussian random processes with variance $N0R_C$, where N0 is the channel noise power density and $R_C$ is the chip rate:

$$n_c(t), n_s(t) \to A(\mu=0, \sigma^2 = N0R_C) \quad (42)$$

A quadrature signal generator 1520 splits the power of r(t) into 2 paths, and then phase-shifts one of the paths by +90° to form I and Q channels. These two channels can be collectively represented as a complex waveform r'(t), whose real and imaginary parts are the I- and Q-components, respectively:

$$r'(t) = s_R'(t) + n'(t) \quad (43)$$

where:

$$s_R'(t) = (A/\sqrt{2})w_n(t)\{c_I(t)[\cos(\omega_0 t + \theta) + j\cos(\omega_0 t + \theta + 90°)] + c_Q(t)[\sin(\omega_0 t + \theta) + j\sin(\omega_0 t + \theta + 90°)]\} \quad (44)$$

$$= (A/\sqrt{2})w_n(t)c(t)e^{-j(\omega_0 t + \theta)}$$

The term c(t) in (44) is a complex spreading waveform that can take on values of ±1±j:

$$c(t) \equiv c_I(t) + jc_Q(t) \quad (45)$$

Similarly, the complex noise term n'(t) in (43) can be expressed as:

$$n'(t) = \eta(t)(e^{-j\omega_0 t})/\sqrt{2} \quad (46)$$

where:

$$\eta(t) \equiv n_c(t) + jn_s(t) \quad (47)$$

As shown in FIG. 15, r'(t) is next down-converted and de-spread by a downconverter 1530 and despreader 1540, respectively, by complex multiplication by $e^{+j\omega_0 t}$ and $c*(t)/\sqrt{2}$ respectively, to produce a waveform x(t) at the Walsh decoder input:

$$x(t) = r'(t)e^{+j\omega_0 t}c*(t)/\sqrt{2} \quad (48)$$

$$= Ae^{-j\theta}w_n(t) + \tilde{n}(t)$$

where:

$$\tilde{n}(t) = (\eta(t)/\sqrt{2})(c*(t)/\sqrt{2}) \quad (49)$$

$$= 1/2[n_c(t) + jn_s(t)][c_I(t) - jc_Q(t)]$$

$$= \tilde{n}_I(t) + j\tilde{n}_Q(t)$$

Hence:

$$\tilde{n}_I(t) = \frac{1}{2}[n_c(t)c_I(t) + n_s(t)c_Q(t)] \quad (50)$$

$$\tilde{n}_Q(t) = \frac{1}{2}[n_s(t)c_I(t) - n_c(t)c_Q(t)] \quad (51)$$

So $\tilde{n}_I(t)$ and $\tilde{n}_Q(t)$ are independent zero-mean normal random processes with variance $N0R_C/2$.

In the de-spreading in FIG. 15, the receiver is synchronized to the long and short spreading codes of the received access probe. This may be accomplished by correlating the R-ACH message preamble (e.g., the preamble 1210 of FIG. 12) against a range of possible offsets of the receiver's PN reference code, and selecting the offset with the highest correlation peak. The preamble length is network-defined, so it may be set to provide reliable synchronization. The despread signal x(t) passes to a joint Walsh Decoder 1550, which will be explained in greater detail with reference to FIG. 18.

Figure 16:
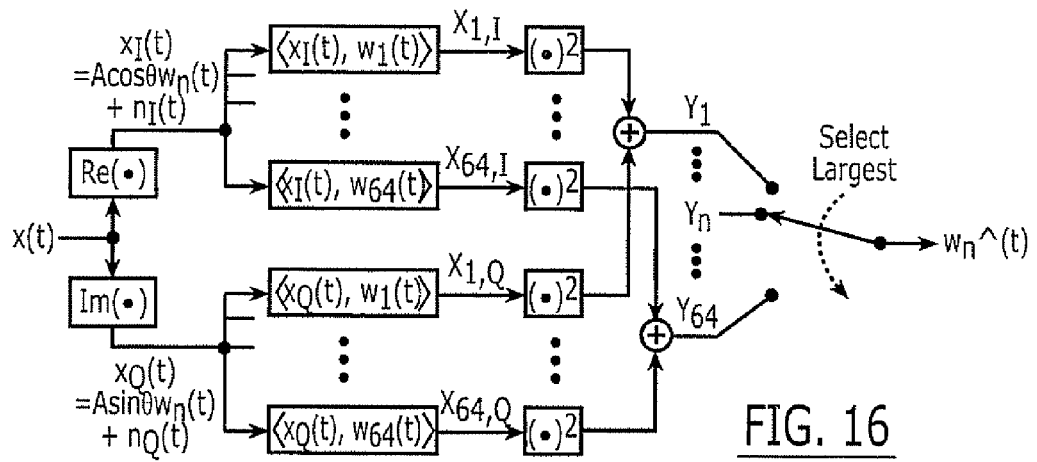

As shown in FIG. 16, in a non-joint Walsh decoder, real (I) and imaginary (O) components of an input waveform x(t) may be separately correlated against each of 64 Walsh words. The correlator output values associated with the kth Walsh word and inputs $x_I(t)$ and $x_Q(t)$ are denoted $X_{k,I}$ and $X_{k,Q}$, respectively:

$$X_{k,I} = (1/T_w)\int_0^{T_w} x_I(t)w_k(t)dt = \quad (52)$$

$$(A\cos\theta/T_w)\int_0^{T_w} w_n(t)w_k(t)dt + (1/T_w)\int_0^{T_w} \tilde{n}_I(t)w_k(t)dt$$

$$X_{kQ} = (1/T_w)\int_0^{T_w} x_Q(t)w_k(t)dt = \quad (53)$$

$$(A\sin\theta/T_w)\int_0^{T_w} w_n(t)w_k(t)dt + (1/T_w)\int_0^{T_w} \tilde{n}_Q(t)w_k(t)dt$$

where $T_w$ is the Walsh word duration equal to 0.2083 msec. (1/4800 sec.).

Because of the orthogonality of the Walsh codes, the first integral on the right side of (52) and (53) equals zero if $w_k(t)$ does not match the transmitted word $w_n(t)$. Also, since $w_k(t)$ is limited to values of ±1, the second integral produces a zero-mean Gaussian random variable with variance $\sigma^2 = N0/2T_w$. Thus, $X_{k,I}$ and $X_{k,Q}$ are independent normal random variables whose means can take one of two values:

$$X_{k,I} \to A(\mu_{k,I} = A\cos\theta, \sigma^2 = N0/2T_w), k=n,$$

$$\to A(\mu_{k,I} = 0, \sigma^2 = N0/2T_w), k \neq n. \quad (54)$$

$$X_{k,Q} \to A(\mu_{k,Q} = A\sin\theta, \sigma^2 = N0/2T_w), k=n,$$

$$\to A(\mu_{k,Q} = 0, \sigma^2 = N0/2T_w), k \neq n. \quad (55)$$

As shown in FIG. 16, the correlator outputs $X_{k,I}$ and $X_{k,Q}$ are then squared and summed to form $Y_k$:

$$Y_k = X_{k,I}^2 + X_{k,Q}^2, (1 \leq k \leq 64) \quad (56)$$

As will be shown later, the squaring and summation process may remove the dependency of $Y_k$ on the received phase angle $\theta$. The transmitted Walsh word estimate $w_n\hat{}(t)$ with the largest $Y_k$ is selected.

FIG. 16 illustrates decoding of a single received Walsh word. However, the R-ACH message encoding process actually generates redundant pairs of Walsh words for transmission. This is a result of the 2× symbol repeat step shown in FIG. 13. These redundant symbols are interleaved using a 32-row by 18-column block interleaver. Symbols are read into the block array by columns from left to right, and read out by rows in a certain pre-determined order. This process forms pairs of redundant rows that contain the same symbols, which, when transferred to the Walsh encoder, produce pairs of identical Walsh words spaced at known time separations.

Figure 17:
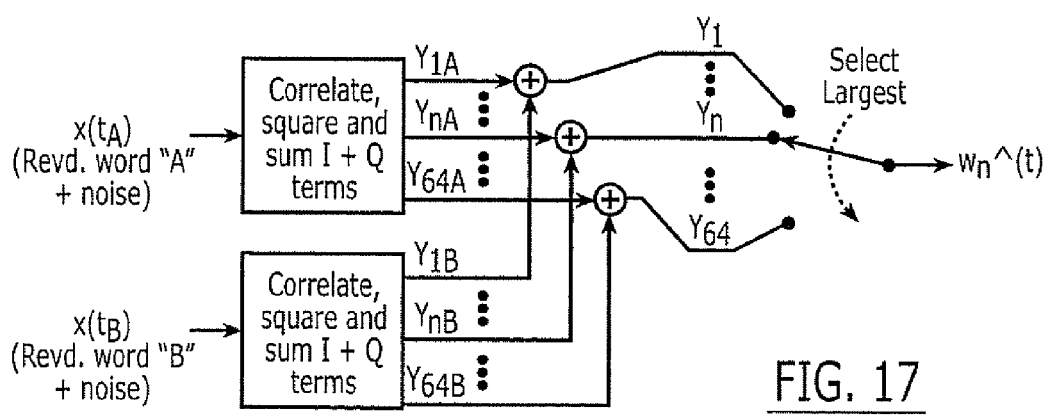

A receiver can use this redundancy to improve the probability of correct Walsh word decoding. An exemplary technique is illustrated in FIG. 17. Two redundant Walsh are denoted "A" and "B", arriving at the receiver at times $t_A$ and $t_B$, respectively. The two received words plus noise are separately correlated against the set of 64 reference Walsh words, and the I and Q correlator output pairs are squared and summed as shown in FIG. 17. The $Y_k$ output values corresponding to received words A and B are designated $Y_{kA}$ and $Y_{kB}$, respectively. These two components are then summed as shown in FIG. 17 to form the composite $Y_k$'s on which the estimate of $w_n\hat{}(t)$ is based:

$$Y_k = Y_{kA} + Y_{kB} = X_{k,IA}^2 + X_{k,QA}^2 + X_{k,IB}^2 + X_{k,QB}^2 \quad (57)$$

To further improve the decoding success probability for low signal-to-noise channels expected in certain environments, such as a satellite environment, a combining similar to that described above for R-EACH access probes may be used in some embodiments of the present invention. It is assumed that all access probes being jointly decoded contain the same information bits to ensure that the same sequence of Walsh words are transmitted in each access probe.

Figure 18:
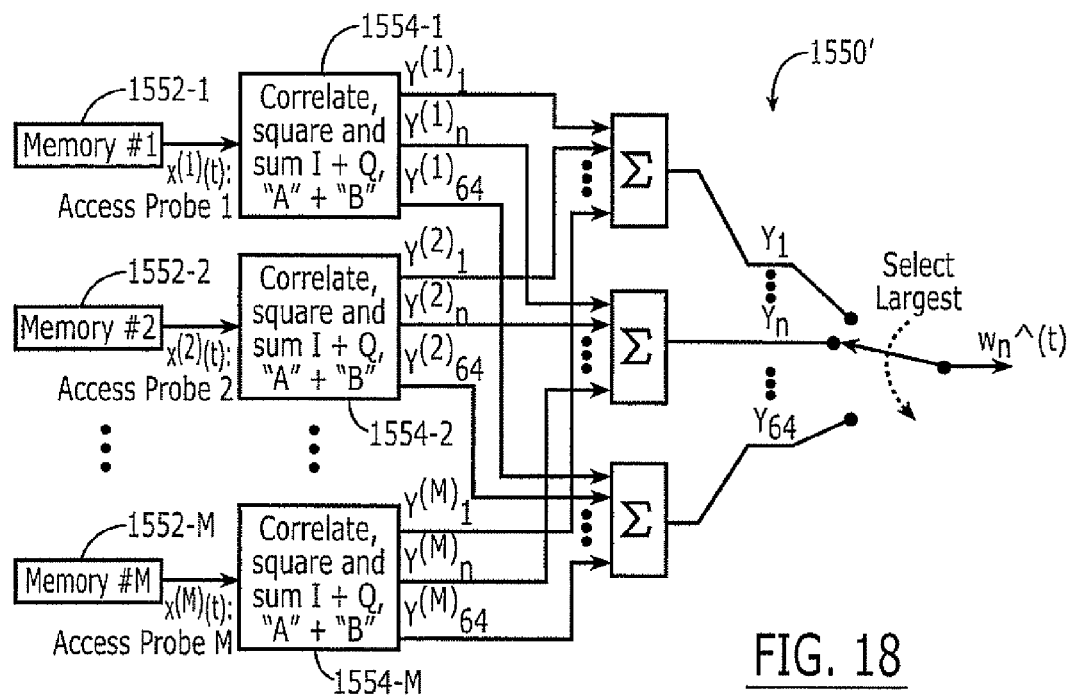

FIG. 18 shows a joint Walsh decoder 1550' for jointly decoding M data sets corresponding to respective access probes, i.e., a decoder that may be used as the joint Walsh decoder 1550 of FIG. 15 according to some embodiments of the present invention. The M data sets are stored in memories 1552-1, 1552-2, ..., 1552-M, which provide the data sets to composite correlator units 1554-1, 1554-2, ..., 1554-M, respective ones of which perform correlation, squaring and summation operations similar to those shown in FIG. 16 to respective ones of the M stored data sets for each of the Walsh codes. $x^{(m)}(t)$ denotes the received input signal plus noise corresponding to access probe "m". From (48) we have:

$$x^{(m)}(t) = A_m e^{-j\theta_m} w_n(t) + n^{(m)}(t), (1 \leq m \leq M) \quad (58)$$

Letting $Y^{(m)}_k$ be the combined squared correlator output for reference Walsh word "k" and access probe "m", from (57):

$$Y^{(m)}_k = Y^{(m)}_{kA} + Y^{(m)}_{kB} = [X^{(m)}_{k,IA}]^2 + [X^{(m)}_{k,QA}]^2 + [X^{(m)}_{k,IB}]^2 + [X^{(m)}_{k,QB}]^2, (1 \leq m \leq M) \quad (59)$$

where:
for k=n:

$$X^{(m)}_{k,IA} \to A(\mu^{(m)}_{k,IA} = A_m \cos\theta_{mA}, \sigma^2 = N0/2T_w),$$

$$X^{(m)}_{k,IB} \to A(\mu^{(m)}_{k,IB} = A_m \cos\theta_{mB}, \sigma^2 = N0/2T_w),$$

$$X^{(m)}_{k,QA} \to A(\mu^{(m)}_{k,QA} = A_m \sin\theta_{mA}, \sigma^2 = N0/2T_w),$$

$$X^{(m)}_{k,QB} \to A(\mu^{(m)}_{k,QB} = A_m \sin\theta_{mB}, \sigma^2 = N0/2Tw), \quad (60)$$

for k≠n:

$$X^{(m)}_{k,IA}, X^{(m)}_{k,IB}, X^{(m)}_{k,QA}, X^{(m)}_{k,QB} \to A(\mu=0, \sigma^2 = N0/2T_w) \quad (61)$$

As shown in FIG. 18, the decoder 1550' sums $Y^{(m)}_k$ terms for the M access probes to form composite $Y_k$'s on which the estimate of $w_n\hat{}(t)$ is based:

$$Y_k = \sum_{m=1}^{M} \{Y^{(m)}_{kA} + Y^{(m)}_{kB}\} \quad (62)$$

$$= \sum_{m=1}^{M} \{[X^{(m)}_{k,IA}]^2 + [X^{(m)}_{k,QA}]^2 + [X^{(m)}_{k,IB}]^2 + [X^{(m)}_{k,QB}]^2\}$$

The decoder 1550' estimates the transmitted Walsh word $w_n\hat{}(t)$ by selecting the word index $n\hat{} = k$ whose $Y_k$ is largest.

At a given time, several MTs (or other sources) may be accessing the R-ACH simultaneously, each transmitting its own sequence of access probes. Therefore, it is desirable that the receiver determines which received access probes belong to each MT, so they can be combined correctly. This can be accomplished by measuring the received timing offset of each access probe's PN-spreading sequence, and combining those access probes whose PN-offsets translate to the same range delay (to within ±1 chip).

The "collision probability", which is defined in this context as the inability of the receiver to distinguish between access probes transmitted by two different MTs, was derived for the enhanced access channel (R-EACH) above, and will not be repeated here. A difference is that the R-ACH transmission slot typically contains the entire access probe and is typically larger than the R-EACH slot. Since the collision vulnerability exists when two access probes begin their transmission in the same slot, the probability that overlapping access probes collide is therefore statistically higher for the R-ACH than the R-EACH. However, the conditional collision probability for 2 MTs within the same satellite spot beam, given that both access probes begin at the same slot boundary, would be substantially the same (<1%) for both the R-ACH and the R-EACH.

Figure 19:
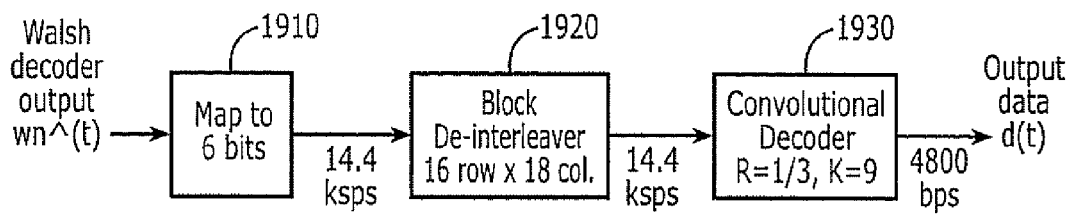
Figure 20:
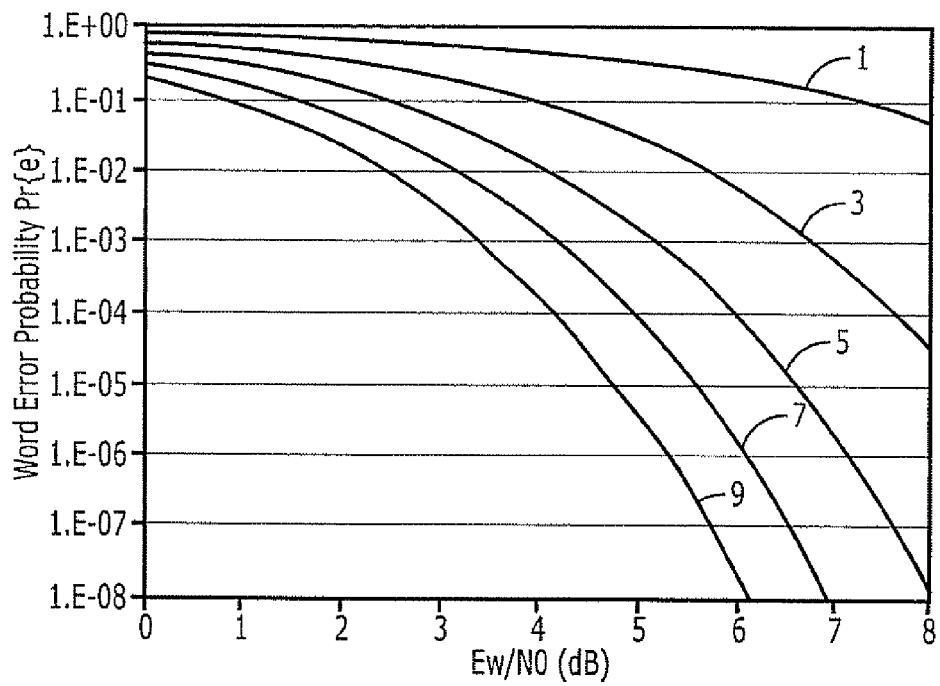
FIGS. 20-23 illustrate simulated performance in access probe acquisition according to some embodiments of the present invention.

FIG. 19 illustrates further apparatus and operations for further decoding the Walsh decoder output $w_n\hat{}(t)$. A symbol mapper 1910 maps the decoded Walsh word index $n\hat{}$ ($1 \leq n\hat{} \leq 64$) to a 6-symbol binary representation, which is passed to a block de-interleaver 1920. The 2× symbol redundancy has already been removed because the redundant "A" and "B" received Walsh words were jointly decoded. Hence the redundant rows are removed from the block de-interleaver 1920, reducing it to 16 rows by 18 columns. After de-interleaving, a forward error correction (FEC) decoder 1930 decodes the symbols, producing the final R-ACH message data at a 4800 bps information rate.

The probability of decoding error for the joint Walsh decoder in FIG. 18 will now be derived. For convenience, $Y_k$ in (62) may be divided by variance $\sigma^2 = N0/2T_w$ to form a normalized random variable $Z_k$:

$$Z_k = Y_k/\sigma^2 \qquad (63)$$

From (62), each of the M access probes contributes 4 terms to $Z_k$, with each term being a squared Gaussian random variable. Therefore, if the reference Walsh word index "k" does not equal the transmitted index "n", the normalized probability density function $f_{Zk}(z)$ is a chi-squared distribution with 4M degrees of freedom. If k=n, $f_{Zk}(z)$ becomes a non-central chi-squared distribution with 4M degrees of freedom and non-centrality parameter $\lambda$:

$$f_{Zk}(z) = \frac{z^{2M-1} e^{-z/2}}{(2M-1)! 2^{2M}} \qquad (64)$$
$$k \ne n$$

$$f_{Zk}(z) = \frac{e^{-(z+\lambda)/2} z^{(2M-1/2)} (\sqrt{\lambda})}{2(\lambda z)^M} I_{2M-1}([\lambda z]^{1/2}) \qquad (65)$$
$$k = n$$

where $I_{2M-1}(x)$ is the modified Bessel function of order 2M−1, and:

$$\lambda = (1/\sigma^2) \sum_{m=1}^{M} \{[\mu_{k,IA}^{(m)}]^2 + [\mu_{k,QA}^{(m)}]^2 + [\mu_{k,IB}^{(m)}]^2 + [\mu_{k,QB}^{(m)}]^2\} \qquad (66)$$

$$= (2T_w/N0) \sum_{m=1}^{M} A_m^2 [\cos^2\theta_{mA} + \sin^2\theta_{mA} + \cos^2\theta_{mB} + \sin^2\theta_{mB}]$$

$$= (4T_w/N0) \sum_{m=1}^{M} A_m^2$$

$Ew_m$ may be defined to be the received energy in Walsh word $w_n(t)$ (either "A" or "B" word) from access probe "m". Then:

$$Ew_m = A_m^2 T_w \qquad (67)$$

Ew may be defined to be the average received energy in $w_n(t)$ from all M access probes:

$$Ew \equiv (1/M) \sum_{m=1}^{M} Ew_m = (T_w/M) \sum_{m=1}^{M} A_m^2 \qquad (68)$$

Substituting (68) into (66) yields the final form of the expression for non-centrality parameter $\lambda$:

$$\lambda = 4M(Ew/N0) \qquad (69)$$

Pr{e} denotes the probability that received Walsh word $w_n(t)$ is decoded in error. Without loss of generality, Pr{e} is the same as the conditional decoding error probability given that Walsh word 1 was transmitted, that is:

$$Pr\{e\} = Pr\{e|n=1\} = 1 - Pr\{c|n=1\} \qquad (70)$$

where Pr{c|n=1} is the conditional probability of correct decoding. Walsh word $w_1(t)$ will be correctly decoded if $Z_1 > Z_k$ for all k>1. Thus, the solution for Pr{c|n=1} has the following integral form:

$$Pr\{c|n=1\} = \int_0^\infty Pr\{c|n=1, Z_1=z\} f_{Z_1}(z) dz \qquad (71)$$

where $f_{Z_1}(z)$ is the non-central chi-squared distribution of (65), and:

$$Pr\{c|n=1, Z_1=z\} = \prod_{k=2}^{64} Pr\{Z_k < z\} = \prod_{k=2}^{64} F_{Z_k}(z) \qquad (72)$$

$F_{Z_k}(z)$ in (72) is the cumulative probability distribution of the (central) chi-squared distribution of (64). It can be shown that:

$$F_{Zk}(z) = 1 - e^{-z/2} \sum_{q=0}^{2M-1} (z/2)^q/q! \quad (k > 1) \qquad (73)$$

Hence:

$$Pr\{c|n=1, Z_1=z\} = \left[1 - e^{-z/2} \sum_{q=0}^{2M-1} (z/2)^q/q!\right]^{63} \qquad (74)$$

Finally:

$$Pr\{e\} = 1 - \int_0^\infty \left[1 - e^{-z/2} \sum_{q=0}^{2M-1} (z/2)^q/q!\right]^{63} f_{Z_1}(z) dz \qquad (75)$$

where $f_{Z_1}(z)$ is given in (65) with $\lambda$ given by (69). Solutions of (75) using numerical integration on a computer are plotted in FIG. 20 versus Ew/N0 for M=1, 3, 5, 7 and 9.

Figure 21:
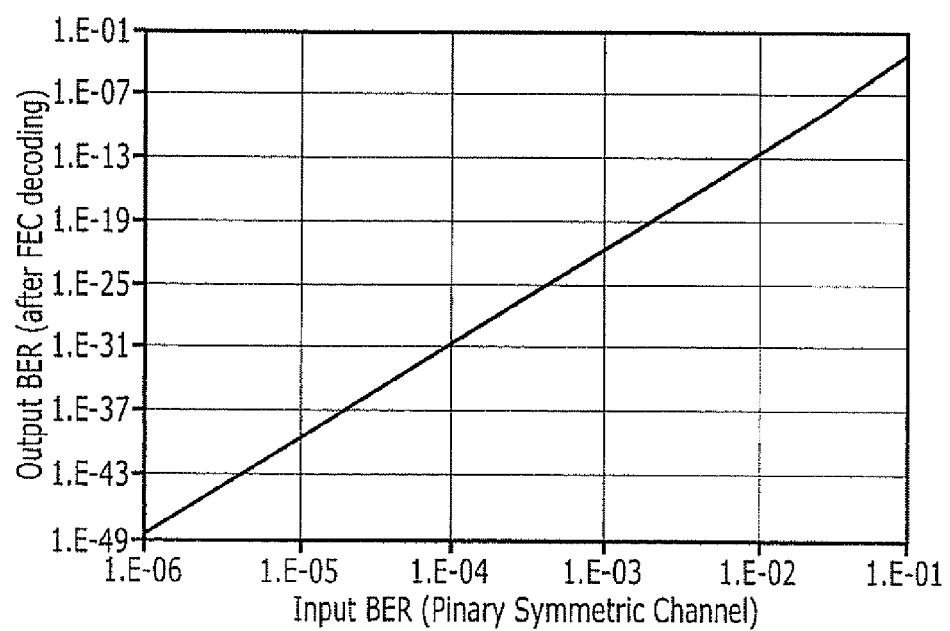

The performance of the convolutional decoder in FIG. 19 may be modeled by the "tighter BSC bound" for a R=⅓, K=9 hard decision Viterbi decoding algorithm. The input/output BER performance of this decoder model is shown in FIG. 21. If the Walsh decoder selects the wrong $w_n^\wedge(t)$, this will cause on average 3 of the 6 decoded output symbols to be in error. However, most of these symbol errors may be corrected by the convolutional decoder. By combining the Walsh word error probability given in (78) with the "tighter BSC bound" performance shown in FIG. 21, the output data BER as a function of received Ew/N0 may be calculated. The Walsh words are transmitted at a rate of 4800 words per second, so Ew/N0 is equivalent to Ebi/N0 at an information rate of 4800 bps.

Figure 22:
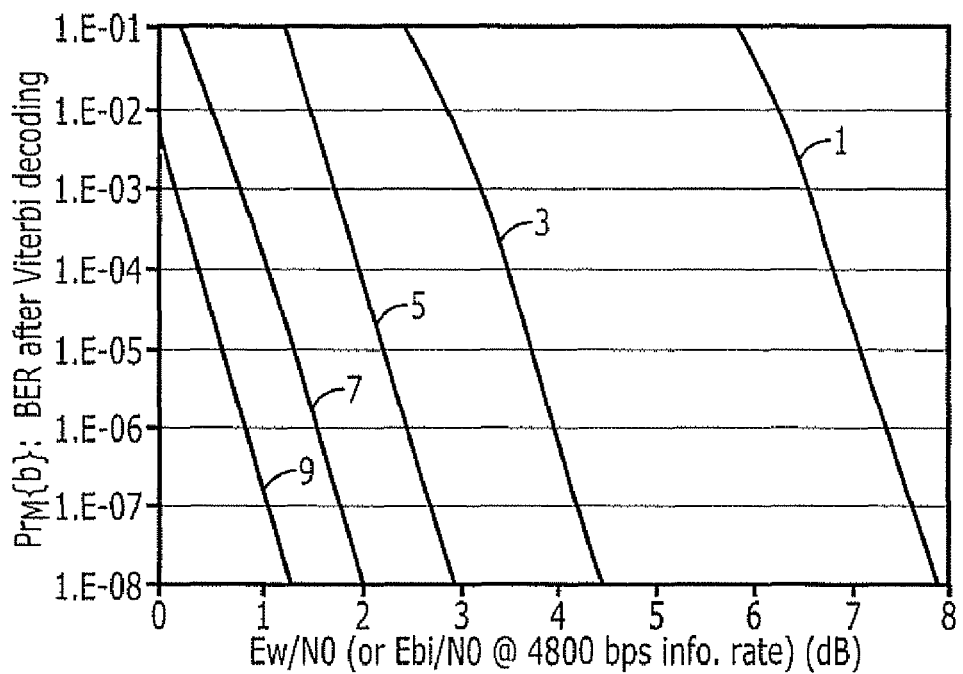

In FIG. 22, the receiver output BER is plotted versus Ew/N0 for values of M=1, 3, 5, 7 and 9. The convolutional decoder performance in FIG. 21 assumes perfectly random input bit errors (infinite interleaving), so these results may be somewhat optimistic for long bursts of errors. In FIG. 22, the M=1 curve represents conventional Walsh decoding one access probe at a time, i.e., "sequential" decoding. It can be seen that this method may be ineffective for Ew/N0 values below about 6 dB. However, for a satellite system operating at a reverse traffic channel rate of 2400 bps and Ebi/N0 of 3.0 dB, the corresponding Ew/N0 is estimated to be as low as 0 dB. By contrast, FIG. 22 shows that a joint decoding method using M=9 access probes may provide acceptable BER performance for Ew/N0 values as low as 0 dB.

Pr{success} may be defined to be the probability that a R-ACH message is successfully received from an access sequence containing M access probes. It is assumed, for purposes of analysis, that a R-ACH message is successfully received if all message bits are decoded correctly. Letting $Pr_M\{b\}$ be the information bit error probability using M-jointly decoded access probes, as shown in the BER curves in FIG. 22, then for the joint decoding approach:

$$Pr\{success\}=(1-Pr_M\{b\})^{96F} \text{ (for joint decoding)} \quad (76)$$

where F is the number of frames in the R-ACH message capsule, with each frame containing 96 bits (incl. 8 FEC encoder tail bits).

Letting Pr{fail} be the probability that the receiver fails to decode the R-ACH message from an access sequence containing M access probes, then:

$$Pr\{fail\} = 1 - Pr\{success\} \quad (77)$$
$$= 1 - (1 - Pr_M\{b\})^{96F} \text{ (for joint decoding)}$$

For sequential decoding, Pr{success} requires that at least one of the M access probes be correctly decoded. Hence Pr{fail} is the joint probability that the receiver sequentially fails to decode all M access probes. This probability can be expressed as:

$$Pr\{fail\}=[1-(1-Pr_1\{b\})^{96F}]^M \text{ (for sequential decoding)} \quad (78)$$

Figure 23:
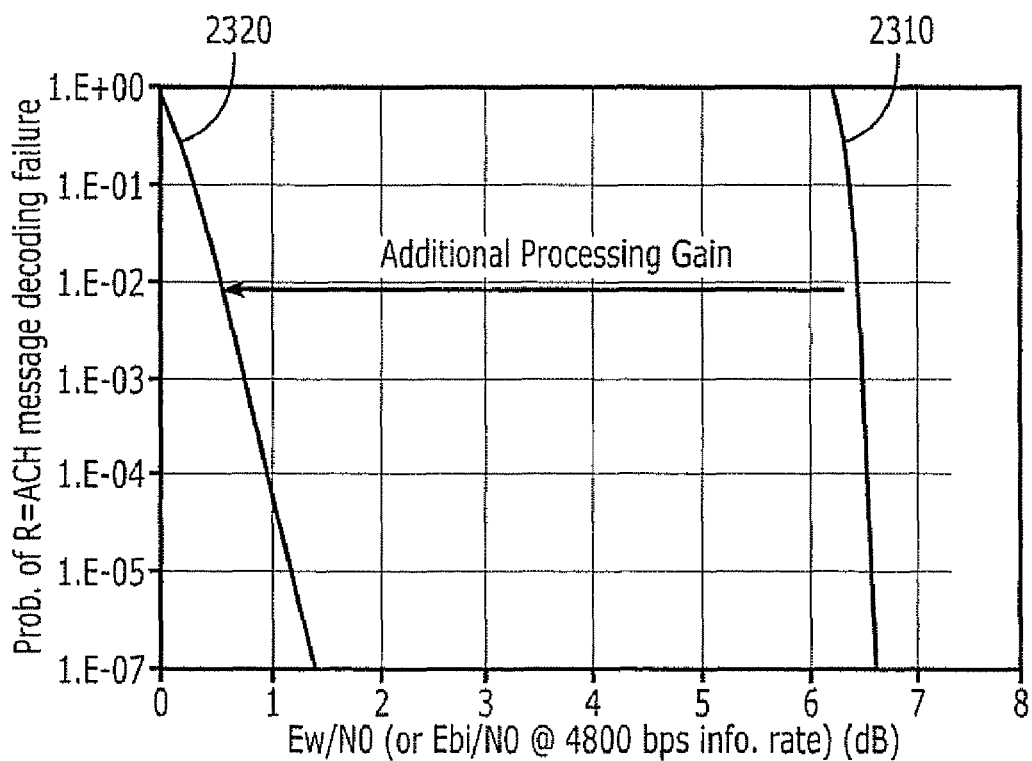

In FIG. 23, Pr{fail} is plotted versus Ew/N0 for both sequential (curve 2310) and joint (curve 2320) decoding methods, using example values of M=9 access probes and F=5 message capsule frames. It can be seen that the joint decoding method may provide about 6 dB of additional processing gain over the sequential approach for Pr{fail}=1% in an unfaded AWGN channel.

It will be appreciated that the apparatus and operations described above are illustrative examples, and that other architectures and operations fall within the scope of the present invention. More generally, in the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of operating a wireless communications system, the method comprising:
   receiving a signal at a component of the wireless communications system;
   generating a plurality of data sets from the received signal, respective ones of the plurality of data sets corresponding to respective ones of a transmitted series of access probes; and
   jointly decoding the plurality of data sets to recover an access probe payload,
   wherein generating a plurality of data sets from the received signal comprises:
      detecting access probe preambles in the received signal; and
      generating respective data sets associated with respective ones of the detected access probe preambles;
   wherein detecting access probe preambles in the received signal comprises detecting a pilot code in the received signal; and
   wherein generating respective data sets associated with respective ones of the detected access probe preambles comprises coherently demodulating and despreading the received signal based on the detected pilot code to generate the plurality of data sets.

2. The method of claim 1:
   wherein generating a plurality of data sets from the received signal further comprises:
      determining respective timings of the detected access probe preambles; and
      identifying a group of data sets associated with a common radioterminal among the plurality of data sets based on the determined timings; and
   wherein jointly decoding the plurality of data sets to recover an access probe payload comprises jointly decoding the group of data sets to recover the access probe payload.

3. The method of claim 1:
   wherein generating a plurality of data sets from the received signal further comprises:
      determining respective spreading code offsets for respective ones the detected access probe preambles; and
      identifying a group of data sets associated with a common radioterminal among the plurality of data sets based on the determined spreading code offsets; and
   wherein jointly decoding the plurality of data sets to recover an access probe payload comprises jointly decoding the group of data sets to recover the access probe payload.

4. The method of claim 3, wherein jointly decoding the group of data sets to recover the access probe payload comprises:
   symbol-by-symbol summing the data sets of the group of data sets to generate a composite data set; and
   decoding the composite data set to recover the access probe payload.

5. The method of claim 4, wherein decoding the composite data set to recover the access probe payload comprises forward error correction decoding the composite data set to recover the access probe payload.

6. The method of claim 1, wherein generating respective data sets associated with respective ones of the detected access probe preambles comprises despreading the received signal responsive to the detected access probe preambles to generate respective data sets associated with respective ones of the access code preambles.

7. The method of claim 6:
   wherein generating a plurality of data sets from the received signal further comprises:
      determining respective timings of the detected access probe preambles; and
      identifying a group of data sets associated with a common radioterminal among the plurality of data sets based on the determined timings; and
   wherein jointly decoding the plurality of data sets to recover an access probe payload comprises jointly decoding the group of data sets to recover the access probe payload.

8. The method of claim 7, wherein jointly decoding the group of data sets to recover the access probe payload comprises:

correlating each data set of the group of data sets with each of a set of channel definition codes to generate respective sets of correlations for respective ones of the channel definition codes;

summing correlations of respective ones of the sets of correlations to generate respective composite data sets; and decoding one of the composite data sets to recover the access probe payload.

9. The method of claim 8, wherein the set of channel definition codes comprises a set of Walsh codes.

10. The method of claim 8, wherein the one of the composite data sets comprises a one of the composite data sets having a greatest correlation with its respective channel definition code.

11. The method of claim 1, wherein the component comprises a space-based component of a satellite wireless communications station and/or ground-based infrastructure operatively associated therewith.

12. The method of claim 1, wherein generating a plurality of data sets from the received signal and jointly decoding the plurality of data sets to recover an access probe payload occur at the space-based component and/or at the ground-based infrastructure.

13. The method of claim 1, wherein receiving a signal at a component of the wireless communications system is preceded by transmitting the series of access probes from a radioterminal, and wherein receiving a signal at a component of the wireless communications system comprises receiving a radio signal comprising the transmitted series of access probes.

14. The method of claim 13, wherein transmitting a series of access probes from a radioterminal comprises transmitting the series of access probes at a substantially uniform power level.

15. A wireless communications system comprising:
at least one component configured to receive a signal, to generate a plurality of data sets from the received signal, respective ones of the plurality of data sets corresponding to respective ones of a transmitted series of access probes, and to jointly decode the plurality of data sets to recover an access probe payload, wherein the at least one component is configured to detect access probe preambles in the received signal and to identify respective ones of the plurality of data sets associated with respective ones of the detected access probe preambles and wherein the at least one component is configured to detect a pilot code in the received signal and to coherently demodulate and despread the received signal based on the detected pilot code to generate the plurality of data sets.

16. The system of claim 15, wherein the at least one component is configured to determine respective timings of the detected access probe preambles, to identify a group of data sets associated with a common radioterminal among the plurality of data sets based on the determined timings and to jointly decode the group of data sets to recover the access probe payload.

17. The system of claim 15, wherein the at least one component is configured to determine respective spreading code offsets for respective ones the detected access probe preambles, to identify a group of data sets associated with a common radioterminal among the plurality of data sets based on the determined spreading code offsets and to jointly decode the group of data sets to recover the access probe payload.

18. The system of claim 17, wherein the at least one component is configured to symbol-by-symbol sum the data sets of the group of data sets to generate a composite data set and to decode the composite data set to recover the access probe payload.

19. The system of claim 18, wherein the at least one component is configured to forward error correction decode the composite data set to recover the access probe payload.

20. The system of claim 15, wherein the at least one component is configured to detect access code preambles in the received signal, to despread the received signal responsive to the detected access probe preambles to generate respective data sets associated with respective ones of the access code preambles, to identify a group the data sets based on respective timings thereof, and to jointly decode the group of data sets to recover the access probe payload.

21. The system of claim 20, wherein the at least one component is configured to determine respective spreading code offsets of the respective data sets and to identify the group of data sets based on the spreading code offsets.

22. The system of claim 20, wherein the at least one component is configured to correlate each data set of the group of data sets with each of a set of channel definition codes to generate respective sets of correlations for respective ones of the channel definition codes, to sum correlations of respective ones of the sets of correlations to generate respective composite data sets and to decode one of the composite data sets to recover the access probe payload.

23. The system of claim 22, wherein the set of channel definition codes comprises a set of Walsh codes.

24. The system of claim 22, wherein the one of the composite data set comprises a one of the composite data sets having a greatest correlation with its respective channel definition code.

25. The system of claim 15, wherein the at least one component comprises a space-based component of a satellite wireless communications station and/or ground-based infrastructure operatively associated therewith.

26. The system of claim 25, wherein the ground-based infrastructure comprises a receiver of a satellite gateway.

27. A non-transitory computer-readable medium comprising computer program code stored therein, the computer program code comprising:
program code configured to identify a plurality of data sets in a signal, respective ones of the plurality of data sets corresponding to respective ones of a transmitted series of access probes; and program code configured to jointly decode the plurality of data sets to recover an access probe payload, wherein the program code configured to identify a plurality of data sets in a signal comprises:
program code configured to detect access probe preambles in the signal; and
program code configured to identify respective data sets associated respective ones of the detected access probe preambles; and wherein the program code configured to detect access probe preambles in the signal comprises program code configured to detect a pilot code in the received signal; and wherein the program code configured to identify respective data sets associated with respective ones of the detected access probe preambles comprises program code configured to coherently demodulate and despread the signal based on the detected pilot code to generate the plurality of data sets.

28. The non-transitory computer-readable medium of claim 27:
wherein the program code configured to identify a plurality of data sets in the signal further comprises:
program code configured to determine respective timings of the detected access probe preambles; and
program code configured to identify a group of data sets associated with a common radioterminal among the plurality of data sets based on the determined timings; and
wherein the program code configured to jointly decode the group of data sets to recover an access probe payload comprises program code configured to jointly decode the group of data sets to recover an access probe payload.

29. The non-transitory computer-readable medium of claim 27:
wherein the program code configured to identify a plurality of data sets in the signal further comprises:
program code configured to determine respective spreading code offsets for respective ones the detected access probe preambles; and
program code configured to identify a group of data sets associated with a common radioterminal among the plurality of data sets based on the determined spreading code offsets; and
wherein the program code configured to jointly decode the plurality of data sets to recover an access probe payload comprises program code configured to jointly decode the group of data sets to recover an access probe payload.

30. The non-transitory computer-readable medium of claim 29, wherein the computer program code configured to jointly decode the group of data sets to recover an access probe payload comprises:
program code configured to symbol-by-symbol sum the data sets of the group of data sets to generate a composite data set; and
program code configured to decode the composite data set to recover the access probe payload.

31. The non-transitory computer-readable medium of claim 30, wherein the program code configured to decode the composite data set to recover the access probe payload comprises program code configure to forward error correction decode the composite data set to recover the access probe payload.

32. The non-transitory computer-readable medium of claim 27, wherein the program code configured to identify respective data sets associated with respective ones of the detected access probe preambles comprises program code configured to despread the received signal responsive to the detected access probe preambles to generate respective data sets associated with respective ones of the access code preambles.

33. The non-transitory computer-readable medium of claim 32:
wherein the program code configured to generate a plurality of data sets from the received signal further comprises:
program code configured to determine respective timings of the detected access probe preambles; and
program code configured to identify a group of data sets associated with a common radioterminal among the plurality of data sets based on the determined timings; and
wherein the program code configured to jointly decode the plurality of data sets to recover an access probe payload comprises program code configured to jointly decode the group of data sets to recover the access probe payload.

34. The non-transitory computer-readable medium of claim 33, wherein the program code configured to jointly decoding the group of data sets to recover the access probe payload comprises:
program code configured to correlate each data set of the group of data sets with each of a set of channel definition codes to generate respective sets of correlations for respective ones of the channel definition codes;
program code configured to sum correlations of respective ones of the sets of correlations to generate respective composite data sets; and
program code configured to decode one of the composite data sets to recover the access probe payload.

35. The non-transitory computer-readable medium of claim 34, wherein the set of channel definition codes comprises a set of Walsh codes.

36. The non-transitory computer-readable medium of claim 34, wherein the one of the composite data sets comprises a one of the composite data sets having a greatest correlation with its respective channel definition code.

* * * * *

UNITED STATES PATENT AND TRADEMARK OFFICE
CERTIFICATE OF CORRECTION

PATENT NO. : 7,907,944 B2
APPLICATION NO. : 11/427576
DATED : March 15, 2011
INVENTOR(S) : Churan Page 1 of 3

It is certified that error appears in the above-identified patent and that said Letters Patent is hereby corrected as shown below:

On the Title Page:

Item (56) References Cited, U.S. Patent Documents: Please add

-- 2005/0135836 A1    6/2005    Rogers et al. --

Column 9, Line 59, (7): Please correct "→ $A(\mu=0$" to read -- → $N(\mu=0$ --

Column 10, Line 12, (10): Please correct " $(A/\sqrt{2})$ " to read -- $(A/\sqrt{2})$ --

Lines 18, (12): Please correct " $\sqrt{2}$ " to read -- $\sqrt{2})$ --

Line 22, (13): Please correct "→ $A(\mu=0$" to read -- → $N(\mu=0$ --

Line 28: Please correct " $(t)/\sqrt{2}$ " to read -- $(t)/\sqrt{2}$ --

Line 33, (14): Please correct "[s'$_R$ (t)" to read -- [s$_R$'(t) --

Line 38, (15): Please correct " $(1/\sqrt{2}$ " to read -- $(1/\sqrt{2})$ --

Line 40, (16): Please correct " $(1/\sqrt{2}$ " to read -- $(1/\sqrt{2})$ --

Column 11, Line 8, (19): Please correct "→ $A(\mu=0$" to read -- → $N(\mu=0$ --

Line 20, (21): Please correct "→ $A(\mu=0$" to read -- → $N(\mu=0$ --

Line 47, (23): Please correct to "→ $A(\mu_m=0$" to read -- → $N(\mu_m=0$ --

Line 53, (24): Please correct " $A_m^2$ " to read -- $A_m^2$ --

Signed and Sealed this
Seventeenth Day of April, 2012

David J. Kappos
*Director of the United States Patent and Trademark Office*

CERTIFICATE OF CORRECTION (continued)
U.S. Pat. No. 7,907,944 B2

Line 57, (25): Please correct "$A_m^2$" to read -- $A_m^2$ --

Line 65, (26): Please correct "$A_m^2$" to read -- $A_m^2$ --

Column 12, Line 7, (27): Please correct "$\sigma_\Sigma^2$" to read -- $\sigma_\Sigma^2$ -- and correct "$A_m^2$" to read -- $A_m^2$ --

Column 15, Line 46, (42): Please, correct "$\to A(\mu$" to read -- $\to N(\mu$ --

Line 57, (44): Please correct "s'$_R$ (t)" to read -- s$_R$'(t) --

Column 16, Line 17, (48): Please correct "$+ \hat{n}(t)$" to read -- $+ n(t)$ --

Line 22, (49): Please correct "$+ \hat{n}(t)$" to read -- $+ n(t)$ --

Line 25, (49): Please correct "$= \hat{n}_I(t) + j\hat{n}_Q(t)$"

to read -- $= n_I(t) + jn_Q(t)$ --

Line 30, (50): Please correct "$\hat{n}_I(t)$" to read -- $n_I(t)$ --

Line 32, (51): Please correct "$\hat{n}_Q(t)$" to read -- $n_Q(t)$ --

Line 33: Please correct "$\hat{n}_I(t)$ and $\hat{n}_Q(t)$" to read -- $n_I(t)$ and $n_Q(t)$ --

Column 17, Line 5, (54): Please correct "$\to A(\mu$" to read -- $\to N(\mu$ --

Line 8, (54): Please correct "$\to A(\mu$" to read -- $\to N(\mu$ --

Line 10, (55): Please correct "$\to A(\mu$" to read -- $\to N(\mu$ --

Line 12, (55): Please correct "$\to A(\mu$" to read -- $\to N(\mu$ --

Line 67, (58): Please correct "$+ \hat{n}^{(m)}$" to read -- $+ n^{(m)}$ --

Column 18, Lines 8, 11, 13 and 15, (60): Please correct "$\to A(\mu$" to read -- $\to N(\mu$ --

Line 18, (61): Please correct "$\to A(\mu$" to read -- $\to N(\mu$ --

Line 26, (62): Please correct "$Y_{kA}^{(m)} + Y_{kB}^{(m)}$" to read -- $Y_{kA}^{(m)} + Y_{kB}^{(m)}$ --

CERTIFICATE OF CORRECTION (continued)
U.S. Pat. No. 7,907,944 B2

Line 28, (62): Please correct " $[X_{k,IA}^{(m)}]^2 + [X_{k,QA}^{(m)}]^2 + [X_{k,IB}^{(m)}]^2 + [X_{k,QB}^{(m)}$ "

to read -- $[X^{(m)}{}_{k,IA}]^2 + [X^{(m)}{}_{k,QA}]^2 + [X^{(m)}{}_{k,IB}]^2 + [X^{(m)}{}_{k,QB}$ --

Column 19, Line 36, (66): Please correct " $[\mu_{k,IA}^{(m)}]^2 + [\mu_{k,QA}^{(m)}]^2 + [\mu_{k,IB}^{(m)}]^2 + [\mu_{k,QB}^{(m)}$ "

to read -- $\mu^{(m)}{}_{k,IA}]^2 + [\mu^{(m)}{}_{k,QA}]^2 + [\mu^{(m)}{}_{k,IB}]^2 + [\mu^{(m)}{}_{k,QB}$ --

Line 39, (66): Please correct " $A_m^2$ " to read -- $A_m^2$ --

Line 42, (66): Please correct " $A_m^2$ " to read -- $A_m^2$ --

Line 55, (68): Please correct " $A_m^2$ " to read -- $A_m^2$ --

Column 24, Claim 27, Line 56: Please correct "associated respective"

to read -- associated with respective --